(12) United States Patent
Francis et al.

(10) Patent No.: US 12,165,798 B2
(45) Date of Patent: Dec. 10, 2024

(54) SURFACE-MOUNTED MAGNETIC-COMPONENT MODULE

(71) Applicant: Murata Manufacturing Co., Ltd., Nagaokakyo (JP)

(72) Inventors: Lee Francis, Milton Keynes (GB); William Jarvis, Milton Keynes (GB); Takayuki Tange, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 816 days.

(21) Appl. No.: 16/924,240

(22) Filed: Jul. 9, 2020

(65) Prior Publication Data

US 2021/0012950 A1    Jan. 14, 2021

Related U.S. Application Data

(60) Provisional application No. 62/871,844, filed on Jul. 9, 2019.

(51) Int. Cl.
| | | |
|---|---|---|
| *H01F 27/28* | (2006.01) | |
| *H01F 27/02* | (2006.01) | |
| *H01F 27/24* | (2006.01) | |
| *H01F 41/02* | (2006.01) | |
| *H01F 41/04* | (2006.01) | |
| *H01F 41/064* | (2016.01) | |
| *H01F 41/12* | (2006.01) | |
| *H02P 27/08* | (2006.01) | |

(52) U.S. Cl.
CPC ....... *H01F 27/2823* (2013.01); *H01F 27/022* (2013.01); *H01F 27/24* (2013.01); *H01F 27/2804* (2013.01); *H01F 41/0206* (2013.01); *H01F 41/041* (2013.01); *H01F 41/064* (2016.01); *H01F 41/127* (2013.01); *H01F 2027/2809* (2013.01); *H02P 27/08* (2013.01)

(58) Field of Classification Search
CPC .................................................... H01F 27/2823
USPC .................................................... 336/200, 229
See application file for complete search history.

(56) References Cited

U.S. PATENT DOCUMENTS

| | | | |
|---|---|---|---|
| 4,103,267 A | 7/1978 | Olschewski | |
| 4,524,342 A | 6/1985 | Mas | |
| 4,975,671 A * | 12/1990 | Dirks | .................. H01F 17/0033 336/200 |
| 5,959,846 A | 9/1999 | Noguchi et al. | |

(Continued)

FOREIGN PATENT DOCUMENTS

| | | |
|---|---|---|
| JP | 09-7844 A | 1/1997 |
| KR | 10-2009-0042156 A | 4/2009 |
| KR | 10-2019-0006918 A | 1/2019 |

OTHER PUBLICATIONS

Official Communication issued in International Patent Application No. PCT/US2020/041349, mailed on Oct. 26, 2020.

(Continued)

*Primary Examiner* — Ronald Hinson
(74) *Attorney, Agent, or Firm* — Keating & Bennett, LLP

(57) ABSTRACT

A magnetic-component module includes a substrate; a core on a first surface of the substrate; a spacer on the core; a winding including wire bonds extending over the core and electrically connecting a first portion of the substrate and a second portion of the substrate, and traces on and/or in the substrate; and an overmold material encapsulating the core, the spacer, and the wire bonds.

16 Claims, 23 Drawing Sheets

(56) References Cited

U.S. PATENT DOCUMENTS

| | | | |
|---|---|---|---|
| 2007/0089293 A1* | 4/2007 | Pitzele | H05K 7/20463 |
| | | | 29/841 |
| 2008/0186124 A1 | 8/2008 | Schaffer et al. | |
| 2009/0108979 A1 | 4/2009 | Kosugi et al. | |
| 2009/0160595 A1* | 6/2009 | Feng | H01L 23/49861 |
| | | | 336/200 |
| 2009/0160596 A1* | 6/2009 | Yang | H01F 27/2895 |
| | | | 336/208 |
| 2010/0156584 A1 | 6/2010 | Yamaguchi et al. | |
| 2014/0085033 A1 | 3/2014 | Wen | |
| 2014/0340186 A1 | 11/2014 | Xianfeng et al. | |
| 2015/0213938 A1* | 7/2015 | Sakaguchi | H01F 27/28 |
| | | | 206/408 |
| 2016/0254090 A1 | 9/2016 | Lloyd | |
| 2016/0351322 A1 | 12/2016 | Banba et al. | |
| 2017/0018349 A1 | 1/2017 | Otsubo et al. | |
| 2019/0019613 A1 | 1/2019 | Perez et al. | |

OTHER PUBLICATIONS

Official Communication issued in International Patent Application No. PCT/US2020/041351, mailed on Oct. 26, 2020.
Official Communication issued in International Patent Application No. PCT/US2020/041355, mailed on Oct. 22, 2020.
Francis, L. et al.; "Surface-Mounted Magnetic-Component Module"; U.S. Appl. No. 16/924,666; filed Jul. 9, 2020.
Francis, L. et al.; "Surface-Mounted Magnetic-Component Module"; U.S. Appl. No. 16/924,668; filed Jul. 9, 2020.
Francis, L. et al.; "Surface-Mounted Magnetic-Component Module"; PCT Application No. PCT/US2020/041349; filed Jul. 9, 2020.
Francis, L. et al.; "Surface-Mounted Magnetic-Component Module"; PCT Application No. PCT/US2020/041351; filed Jul. 9, 2020.
Francis, "Surface-Mounted Magnetic-Component Module", U.S. Appl. No. 17/568,853, filed Jan. 5, 2022.

* cited by examiner

SURFACE-MOUNTED MAGNETIC-COMPONENT MODULE

CROSS REFERENCE TO RELATED APPLICATIONS

This application claims the benefit of U.S. Patent Application No. 62/871,844 filed on Jul. 9, 2019. The entire contents of this application are hereby incorporated by reference.

BACKGROUND OF THE INVENTION

1. Field of the Invention

The present invention relates to magnetic components and magnetic-component modules, and in particular, to transformers and surface-mounted transformer modules.

2. Background

Transformers are used in many applications, for example, to change the voltage of input electricity. A transformer has one or more primary windings and one or more secondary windings wound around a common core of magnetic material. The primary winding(s) receive electrical energy, such as from a power source, and couples this energy to the secondary winding(s) by a changing magnetic field. The energy appears as an electromagnetic force across the secondary winding(s). The voltage produced in the secondary winding(s) is related to the voltage in the primary winding(s) by the turns ratio between the primary and secondary windings. Typical transformers are implemented using an arrangement of adjacent coils. In a toroidal transformer, the windings wind around a toroid-shaped core.

Demands in many fields, including telecommunications, implantable medical devices, and battery-operated wireless devices, for example, have prompted design efforts to minimize the size of components with lower-cost solutions that exhibit the same or better performance but operate with reduced power consumption. The reduced power consumption is often prompted by further requirements in lowering supply voltages to various circuits. Accordingly, there is a continuing need to provide more efficient, smaller, and lower cost magnetic components.

SUMMARY OF THE INVENTION

To overcome the problems and to satisfy the needs described above, preferred embodiments of the present invention provide magnetic-component modules each including a spacer arranged over a core, and wire bonds extending over the spacer and the core.

According to a preferred embodiment of the present invention, a magnetic-component module includes a substrate; a core on a first surface of the substrate; a spacer on the core; a winding including wire bonds extending over the core and electrically connecting a first portion of the substrate and a second portion of the substrate, and traces on and/or in the substrate; and an overmold material encapsulating the core, the spacer, and the wire bonds.

Electrical components can be attached to a second surface of the substrate that is opposite to the first surface of the substrate. The spacer can conform to a top of the core. An edge of the spacer can overhang the core. The spacer can extend over an entire outer surface of the core or over substantially the entire outer surface of the core.

The magnetic-component module can further include a gap between a bottom surface of the core and the first surface of the substrate, where the overmold material can fill the gap. An adhesive can be in the gap between the core and the substrate, and the overmold material can encapsulate the adhesive.

The magnetic-component module can further include input/output pins on a surface of the substrate. The input/output pins can be exposed on the first surface of the substrate.

The magnetic-component module can further include an adhesive to mount the core to the substrate. The spacer can include a polyethylene terephthalate (PET) resin.

According to a preferred embodiment of the present invention, a method of manufacturing a magnetic-component module includes providing a substrate; adhering a core on the portion of the first surface of the substrate on which the first adhesive is deposited; providing a spacer on the core; defining a winding including extending wire bonds over the core and electrically connecting a first conductive portion of the substrate and a second conductive portion of the substrate, and providing traces on and/or in the substrate; and overmolding the core, the spacer, and the wire bonds with overmold material.

The method of manufacturing a magnetic-component module can further include depositing a second adhesive on the core and adhering the spacer on the core using the second adhesive.

The method of manufacturing a magnetic-component module can further include attaching electrical components to a second surface of the substrate that is opposite to the first surface of the substrate. The method of manufacturing a magnetic-component module can further include overmolding the electrical components.

The spacer can conform to a top of the core. An edge of the spacer can overhang the core. The spacer can extend over an entire outer surface of the core or over substantially the entire outer surface of the core. The spacer can include a polyethylene terephthalate resin.

The adhesive can create a gap between the core and the substrate, and the overmold material can encapsulate the first adhesive.

The method of manufacturing a magnetic-component module can include mounting input/output pins on a surface of the substrate. The input/output pins can be exposed on the first surface of the substrate.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
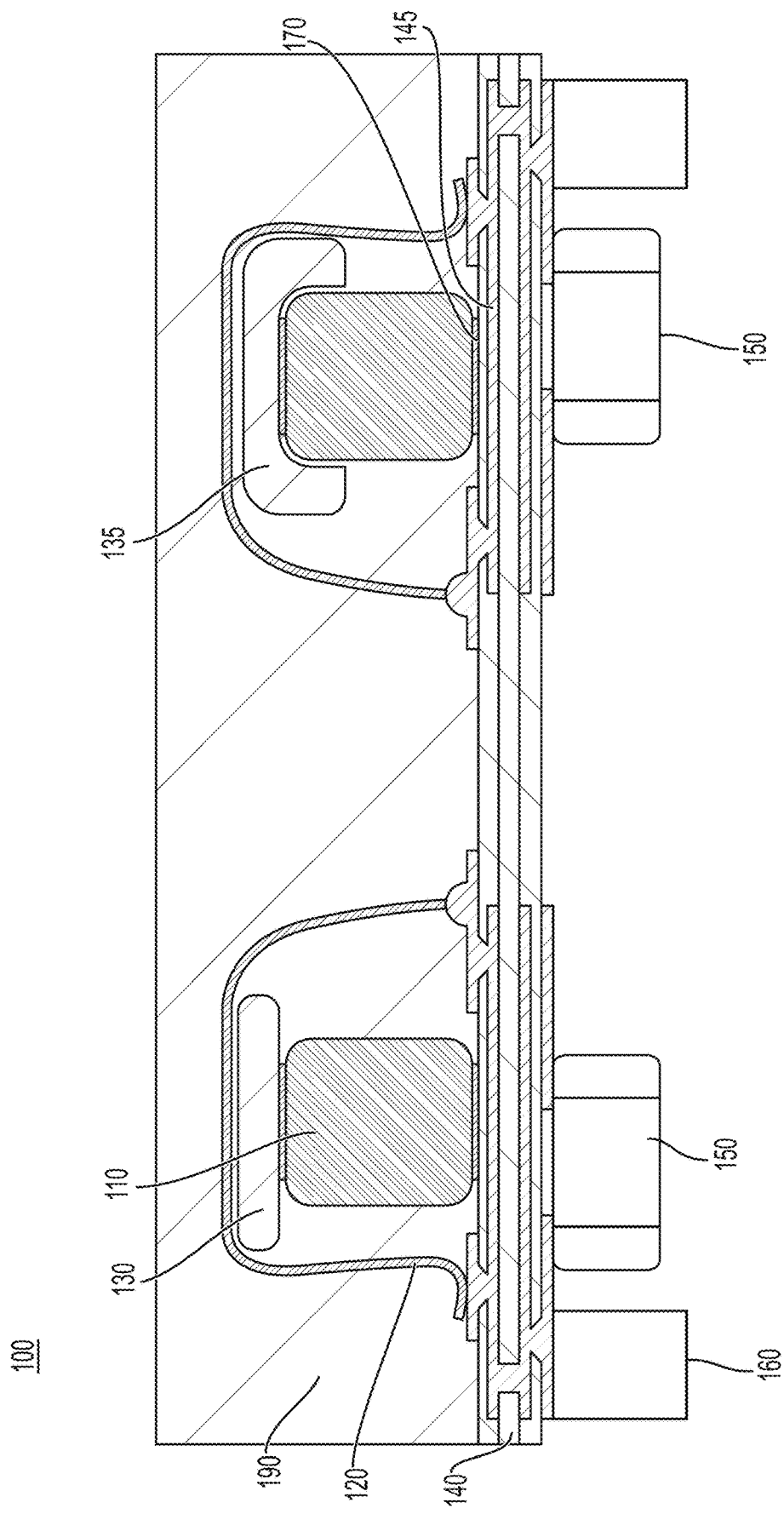
FIG. 1 shows a magnetic-component module with a spacer attached to a core.

FIG. 1 shows a magnetic-component module 100 with a core 110, winding(s) that are defined by wire bonds 120 and traces 145, a spacer 130, and a substrate 140, such as a multilayer printed circuit board (PCB). An overmold material 190 can cover or encapsulate the core 110, the wire bonds 120, and the spacer 130. The magnetic-component module 100 can be a transformer with primary and secondary windings that extend around the core 110, as shown in FIG. 1. Although FIG. 1 shows a transformer with two windings, other magnetic components can also be used, including, for example, an inductor with a single winding or a transformer with three or more windings. Circuitry components and/or connectors can be located on the bottom surface of the substrate. As shown in FIG. 1, the magnetic-component module 100 can include surface-mount (SM) or input/output (I/O) pins 160 that are located on the bottom surface of the substrate 140. The magnetic-component module 100 can include electrical components 150 mounted on the bottom surface of the substrate 140. The electrical components 150 can include passive components, such as, capacitors, resistors, etc. and can include active components, such as transistors.

Figure 2:
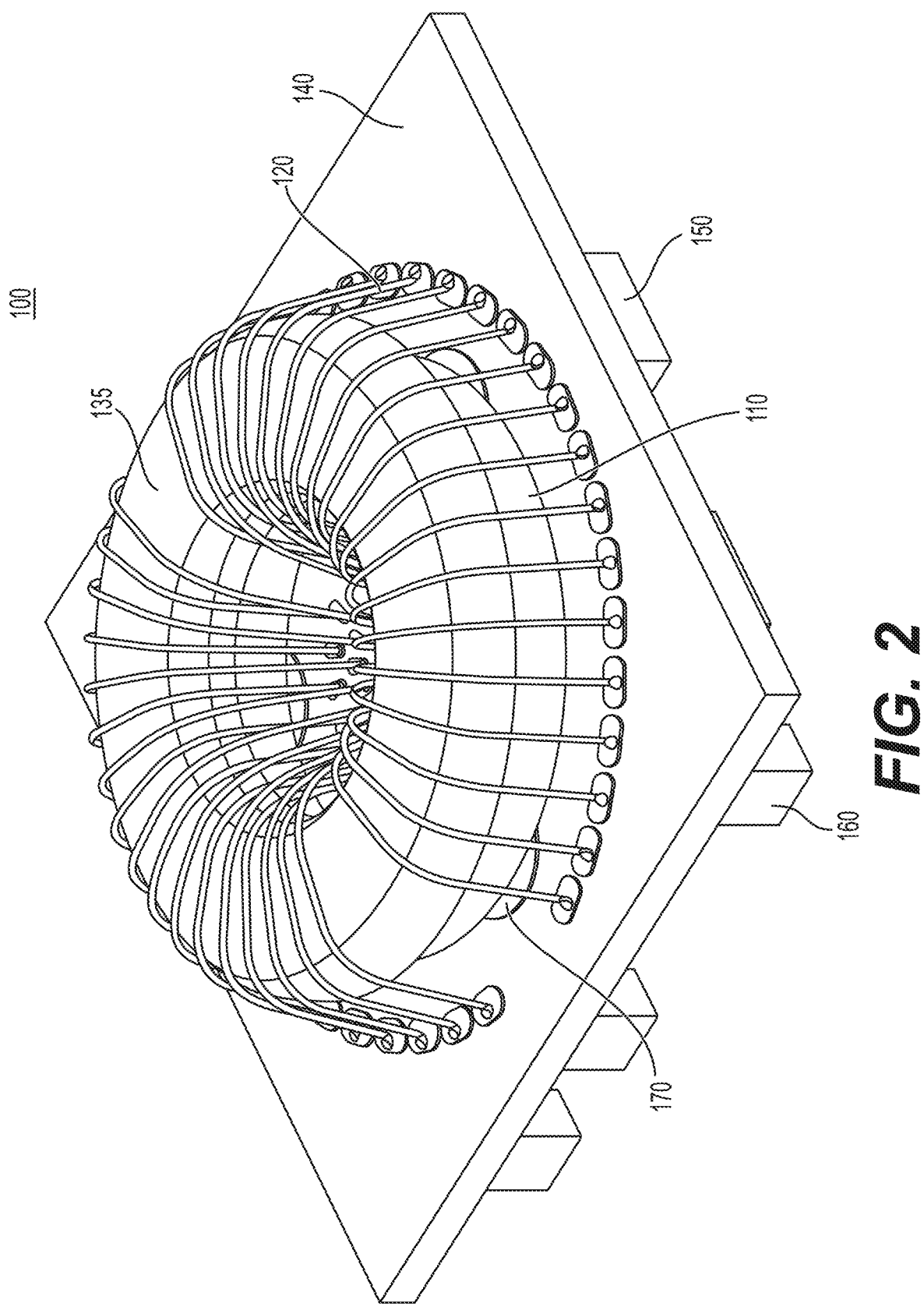
FIG. 2 is a top perspective view of the magnetic-component module of FIG. 1.

The core 110 can be an uninsulated core and can be fixed (i.e., adhered) to the multilayer substrate 140 with adhesive 170. The adhesive 170 can include spaced apart portions along the bottom of the core 110 as shown in FIG. 2 or can extend along the entire bottom of the core 110. The spacer 130 can be an insulated spacer and can be fixed (i.e., adhered) to a top of the core 140. The spacer 130 can be made by an injection molding process. The spacer 130 can be made with any suitable material that can be injection molded, including polyethylene terephthalate (PET) resin. The spacer 130 can help ensure that the wire bonds 120 do not contact the core 110, which would cause the magnetic-component module to short circuit. Although the spacer is shown as a single unitary body in the figures, the spacer can include two or more bodies arranged around the core.

Figure 4:
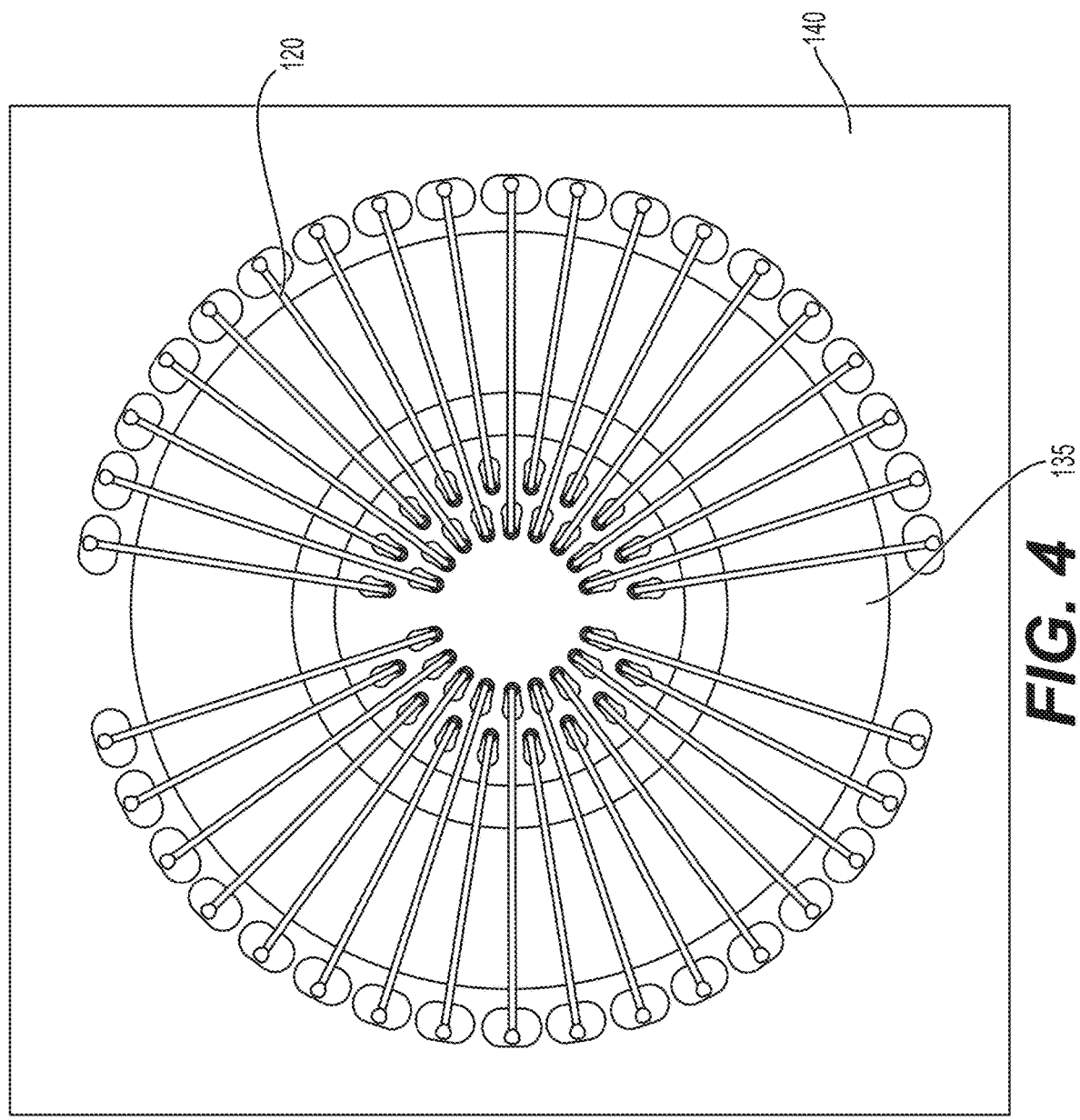
FIG. 4 is a top view of the magnetic-component module of FIG. 1.
Figure 15:
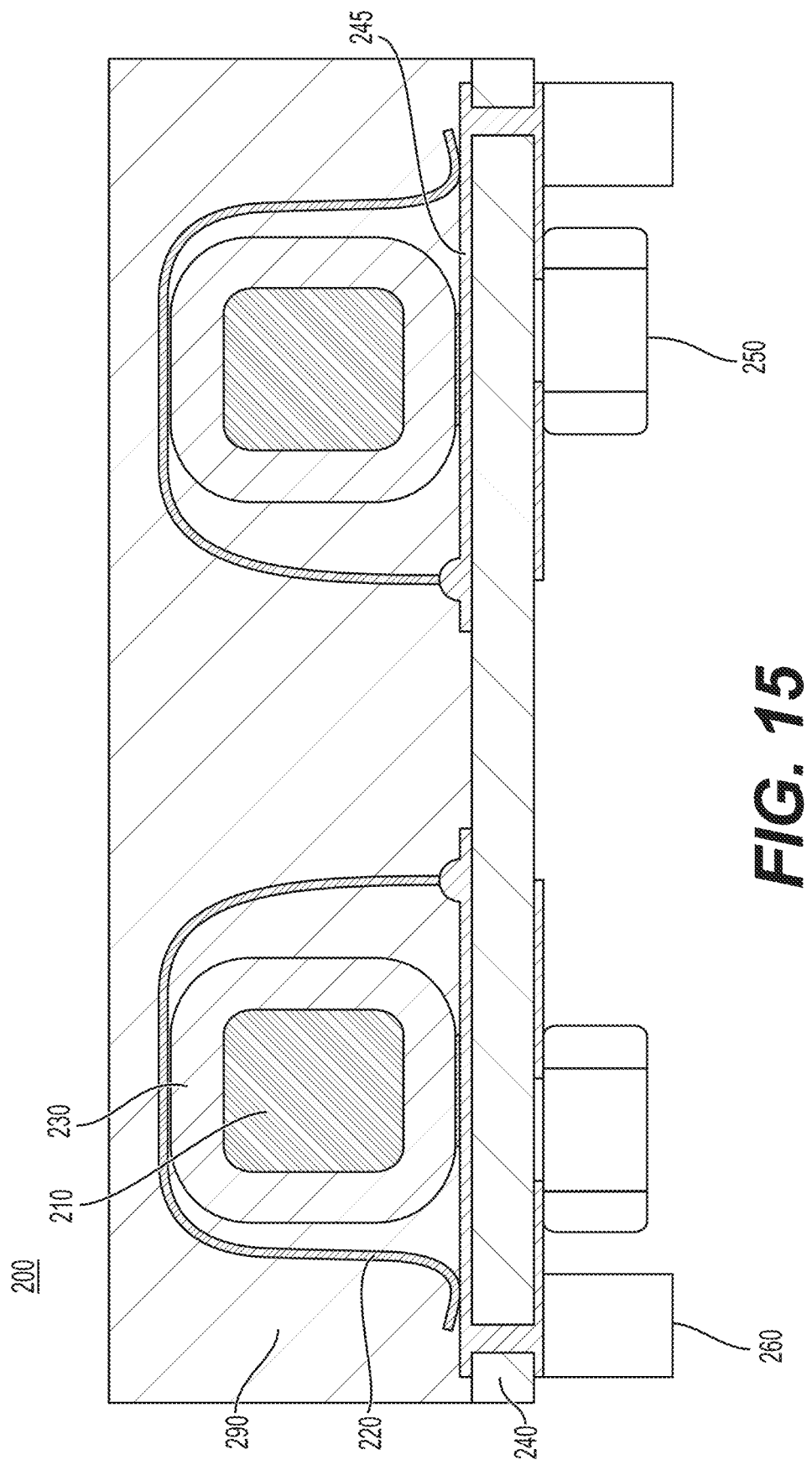
FIG. 15 shows a magnetic-component module with a spacer surrounding a core.

The windings are disposed around the core 110 and include wire bonds 120 that extend over the core 110 and traces 145 on or in the substrate 140 that extend under the core 110. The wire bonds 120 include two ends that are bonded to different portions of the substrate 140. As shown in FIG. 4, the wire bonds 120 can be attached to the substrate 140 in a single row outside of the spacer 135 and in two rows in the interior of the spacer 135. Other arrangements are also possible, including two or more rows outside the spacer 135 and one row or more than two rows in the interior of the spacer 135. The wire bonds 120 define a top half of a winding. The wire bonds 120 can include copper wires, gold wires, aluminum wires, or any other suitable conductive material. The wire bonds 120 can be attached to the substrate 140 by ball bonding, wedge bonding, compliant bonding, or any other suitable attachment method. The traces 145 can be located on inner or outer layers of the substrate 140 and define a bottom half of the winding. If the core 110 is uninsulated, then the traces 145 can be located on an inner layer or the bottom surface of the substrate 140. If the core 110 is insulated or if the spacer 130 completely surrounds the outer surface of the core 110 as shown in FIG. 15, then the traces 145 can also be on the top surface of the substrate 140.

Figure 3:
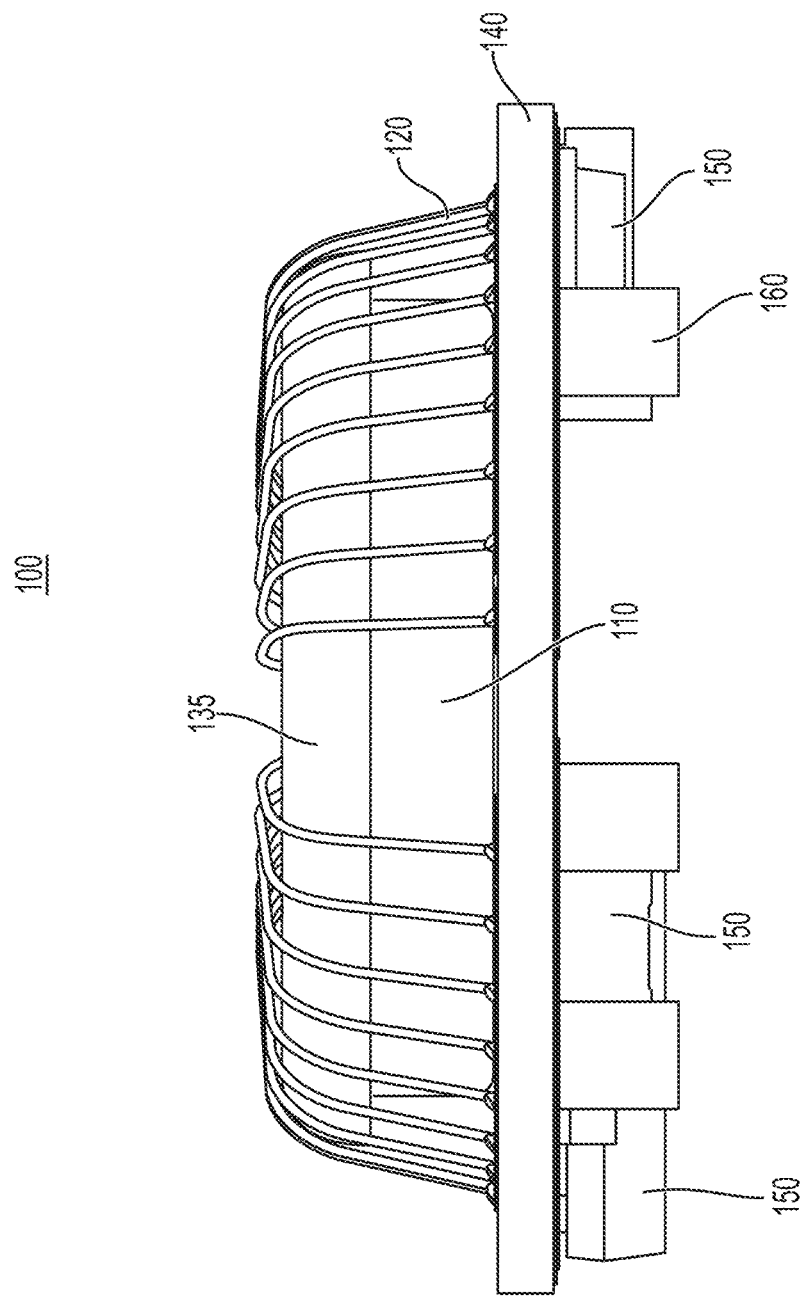
FIG. 3 is a side view of the magnetic-component module of FIG. 1.

The left side of FIG. 1 shows an example of a spacer 130 between the top of the core 110 and the wire bonds 120 to prevent the wire from touching the core 110 and being short-circuited. As shown, the spacer 130 is wider than a width of the core 110 to create an overhang that maintains a predetermined distance between the wire bond 120 and the core 110. The right side of FIG. 1 shows an alternative configuration of the spacer 135 in which the spacer 135 conforms to the top portion of the core 110 and partially covers the side walls of the core 110. It should be understood that, typically, the spacer will have a single cross-sectional shape throughout the spacer and that the two different cross-sectional shapes shown in FIG. 1 are examples of possible cross-sectional shapes. FIGS. 2-4 show a magnetic-component module 100 that uses the spacer 135 that conforms to the top portion of the core 110 and that partially covers the side walls of the core 110, and FIGS. 9-14 show a magnetic-component module that uses the spacer 130 that is wider than the width of the core 110 to create an overhang.

FIG. 1 also shows that the core 110, the spacer 130, and wire bonds 120 can be overmolded with an overmold material 190 to stabilize and protect the components of the magnetic-component module. Instead of overmolding, it is also possible to use a potting method or an encapsulation method to stabilize and protect the components of the magnetic-component module.

FIGS. 2-4 show an example of magnetic-component module 100 with the spacer 135 and without the overmold material 190. FIG. 2 is a top perspective view, FIG. 3 is a side view, and FIG. 4 is a top view. FIGS. 2-4 show views of the spacer 135 having a single cross-sectional shape and conforming to the top portion of the core 110. FIGS. 2-4 show the core 110, the wire bonds 120, the substrate 140, the components 150, the I/O pins 150, and the adhesive 170.

Figure 5:
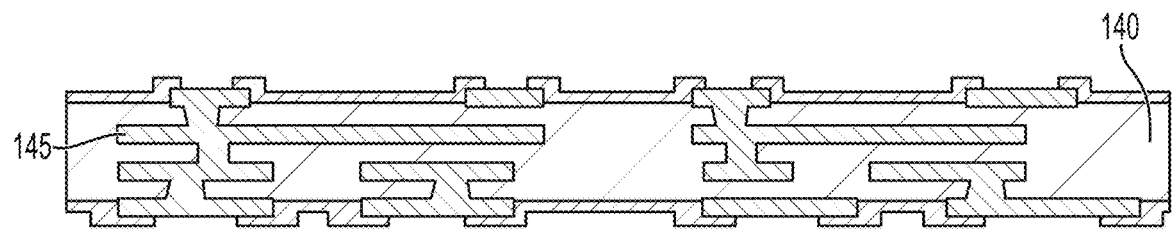
FIGS. 5-14 show steps of a method of manufacturing the magnetic-component module 100 of FIG. 1.
Figure 6:
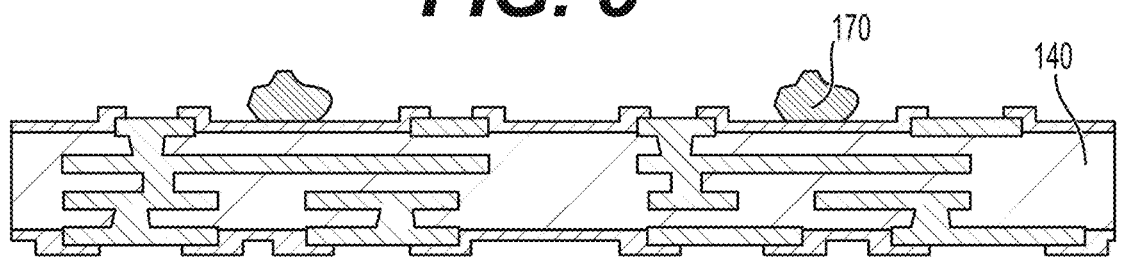
Figure 7:
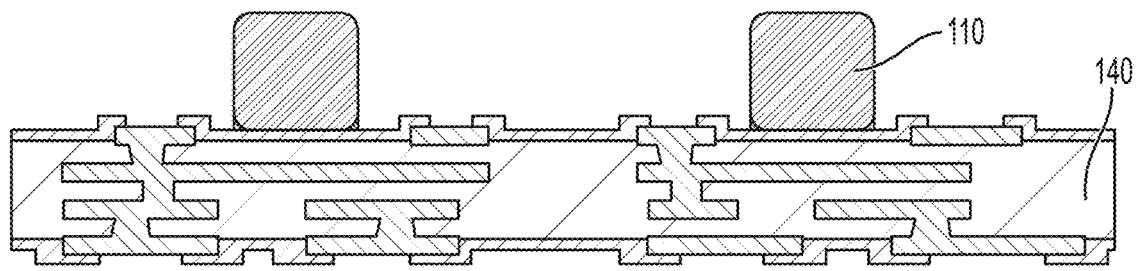
Figure 8:
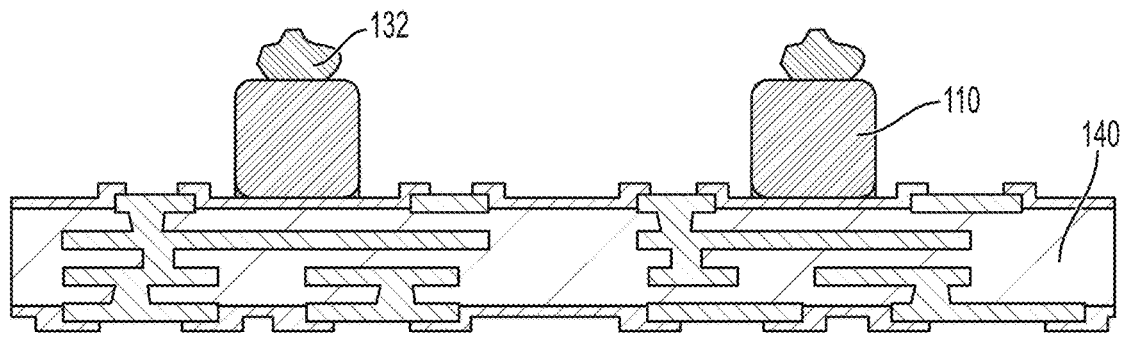
Figure 9:
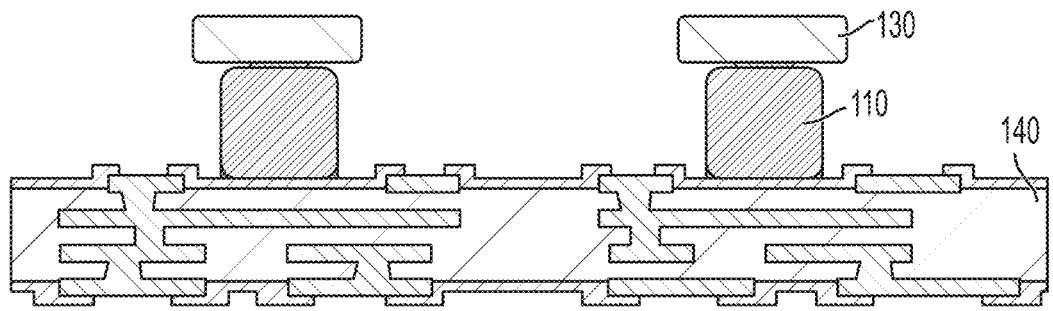
Figure 10:
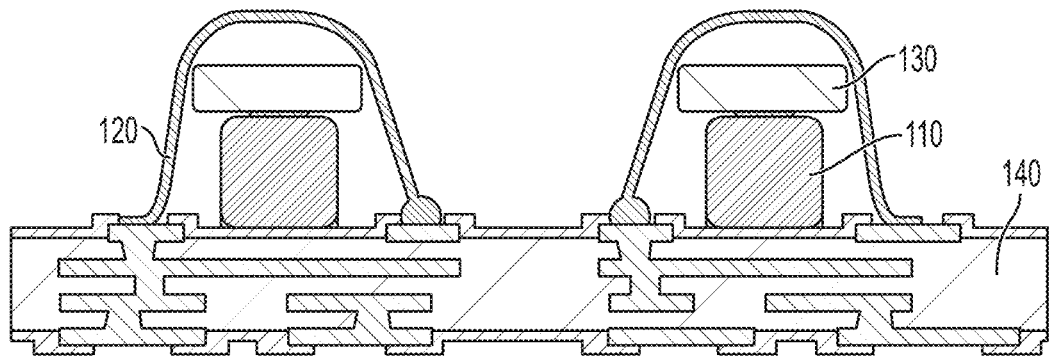
Figure 11:
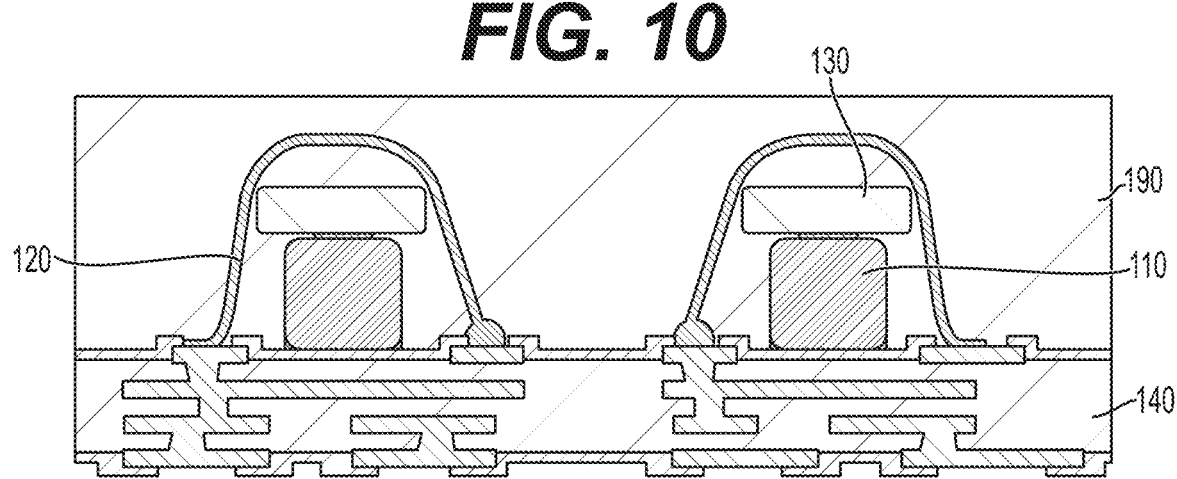
Figure 12:
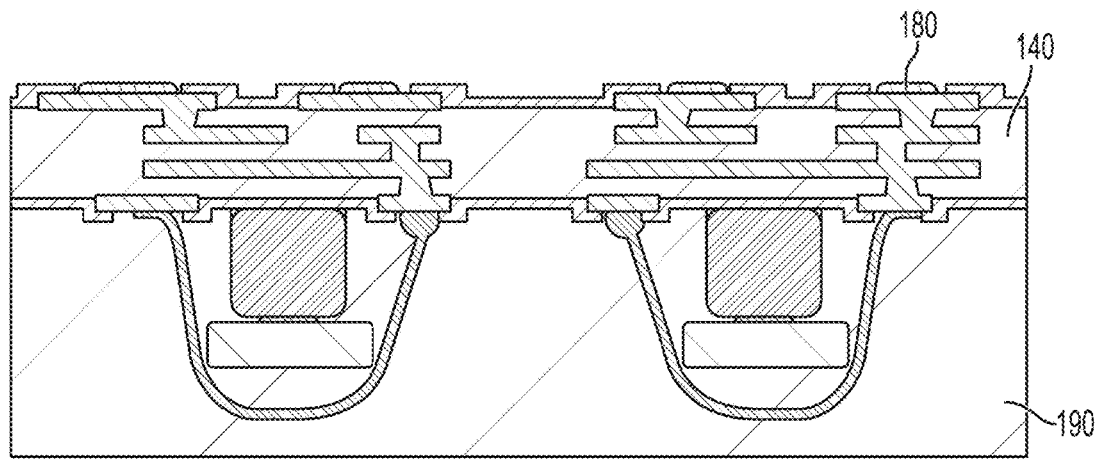
Figure 13:
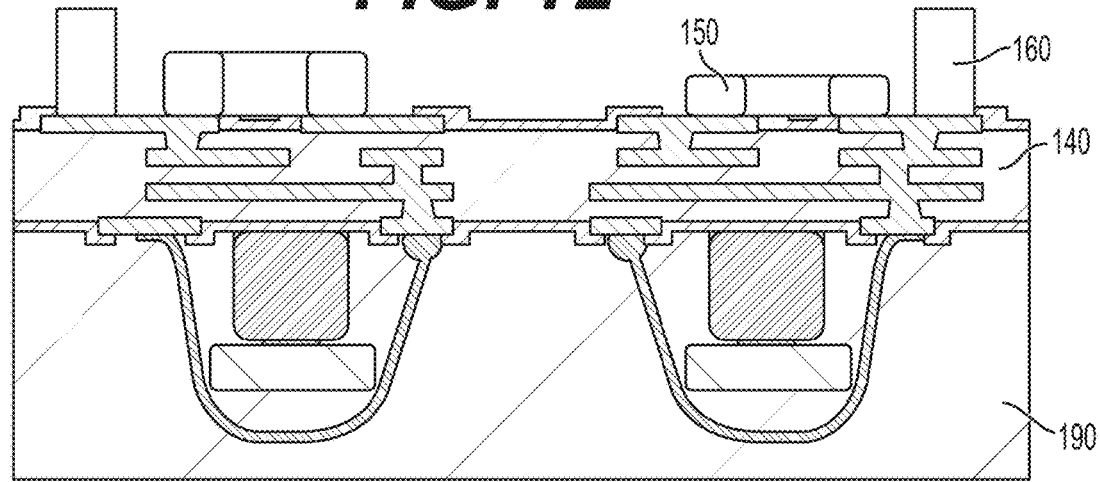
Figure 14:
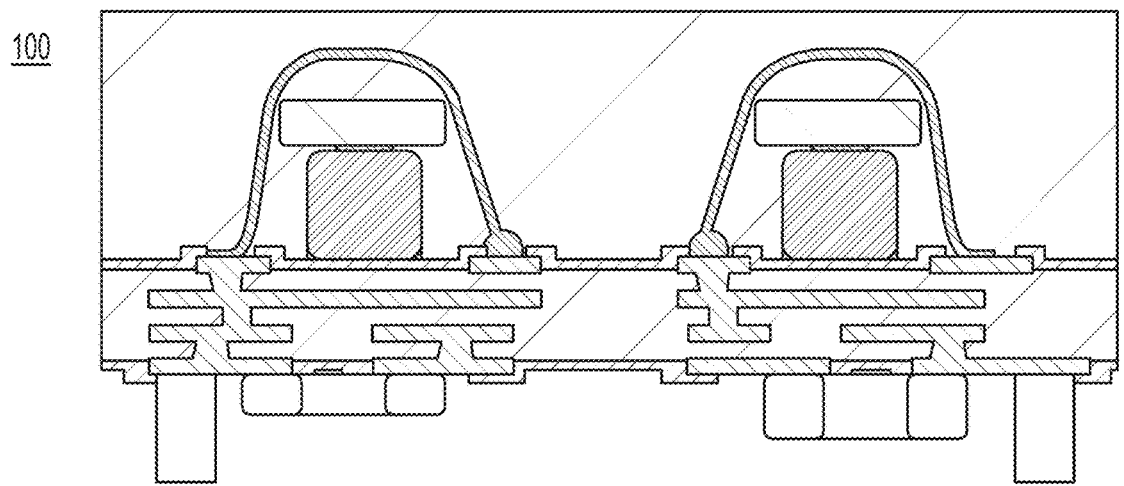

FIGS. 5-14 show steps of a method of manufacturing the magnetic-component module 100 with the spacer 130. FIG. 5 shows that the substrate 140, such as a PCB, can be provided with traces 145 according to conventional techniques. FIG. 6 shows that the adhesive 170 can be deposited on portions of the surface of the substrate 140 on which the core 110 is to be mounted. FIG. 7 shows the core 110 can be adhered to the substrate 140 where the adhesive 170 was deposited. FIG. 8 shows that an adhesive 132 can be deposited on a top surface of the core 110. FIG. 9 shows that the spacer 130 can be adhered on the top surface of the core 110. FIG. 10 shows that the wire bonds 120 can be formed such that the wire bonds 120 are attached to the substrate 140, extend over the core 110 and the spacer 130, and do not contact the core 110. FIG. 11 shows that an overmold material 190 can be overmolded to cover or encapsulate the core 110, the wire bonds 120, and the 130 spacer. FIG. 12 shows that solder 180 can be deposited on the substrate 140 on the surface opposite to the overmold material 190. FIG. 13 shows that the components 150 and the I/O pins 160 can be mounted on the substrate 140 using the solder 180. FIG. 14 shows the finished magnetic-component module 100 shown in the left side of FIG. 1.

FIG. 15 shows a magnetic-component module 200 with a core 210 that is fixed (i.e., adhered) to a substrate 240. The magnetic-component module 200 include the core 210, winding(s) that are defined by wire bonds 220 and traces 245, a spacer 230, and a substrate 240. The core 210 is covered on all sides by the spacer 230. As in FIG. 1, wire bonds 220 define the top half of the windings. Traces 245 on the top surface of substrate 240 define the bottom half of the windings. Because the spacer 230 covers the entire outer surface of the core 210, it is not necessary to use a more-expensive multilayer substrate, and it is possible to use a less-expensive substrate 240 with no internal layers. But it is also possible to use a multilayer substrate in which the traces 245 defining the bottom half of the windings are located on the top surface or an internal layer of the multilayer substrate. Circuitry components and/or connectors can be located on the bottom surface of the substrate 240. FIG. 2 also shows that the core 210, the spacer 230, and the wire bonds 220 can be overmolded with overmold material 290. Instead of the spacer 230 extending over the entire outer surface of the core 210, it is also possible that the spacer 230 only extends over substantially the entire outer surface of the core 210. For example, the spacer 230 can extend over substantially the entire outer surface of the core 210 by having a C-shape such that the top and bottom and either the inner or outer side of the core 210 are covered, while either the outer or inner side of the core 210 is exposed. Alternatively, the spacer 230 can extend over substantially the entire outer surface of the core 210 by using two spacers, one that extends over the top of the core 210 and one that extends over the bottom of the core 210.

As shown in FIG. 15, the magnetic-component module 200 can include surface-mount (SM) or input/output (I/O) pins 260 that are located on the bottom surface of the substrate 240. The magnetic-component module 200 can include electrical components 250 mounted on the bottom surface of the substrate 240. The electrical components 250 can include passive components, such as, capacitors, resistors, etc. and can include active components, such as transistors.

Figure 16:
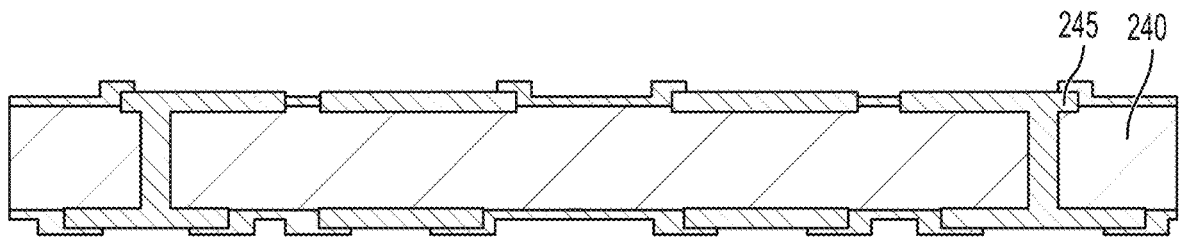
FIGS. 16-23 show steps of a method of manufacturing the magnetic-component module of FIG. 15.
Figure 17:
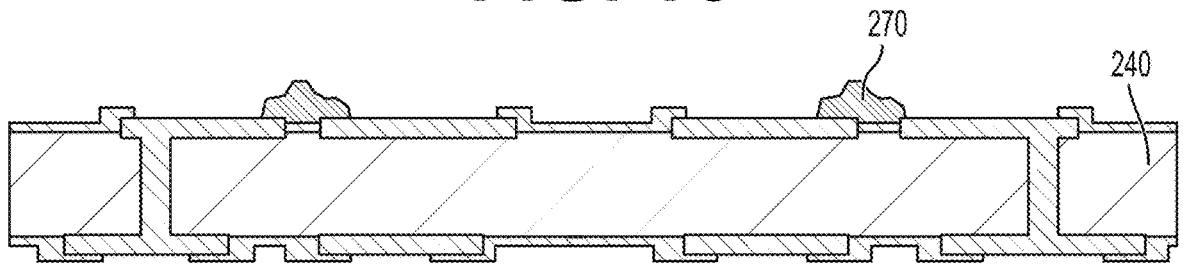
Figure 18:
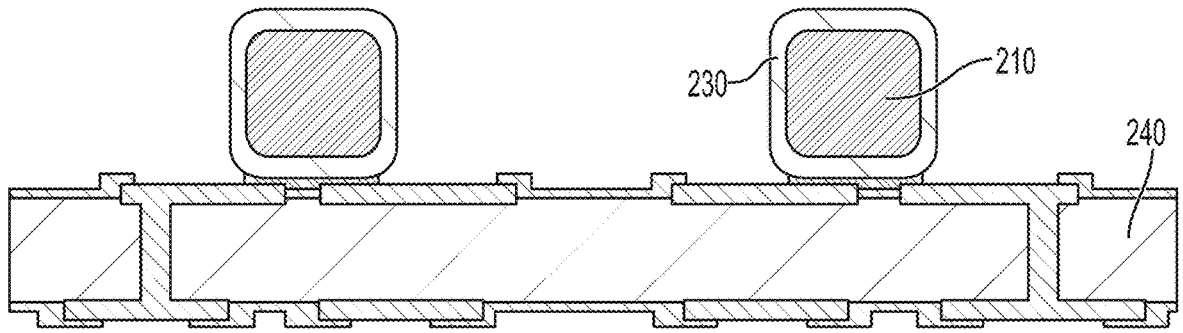
Figure 19:
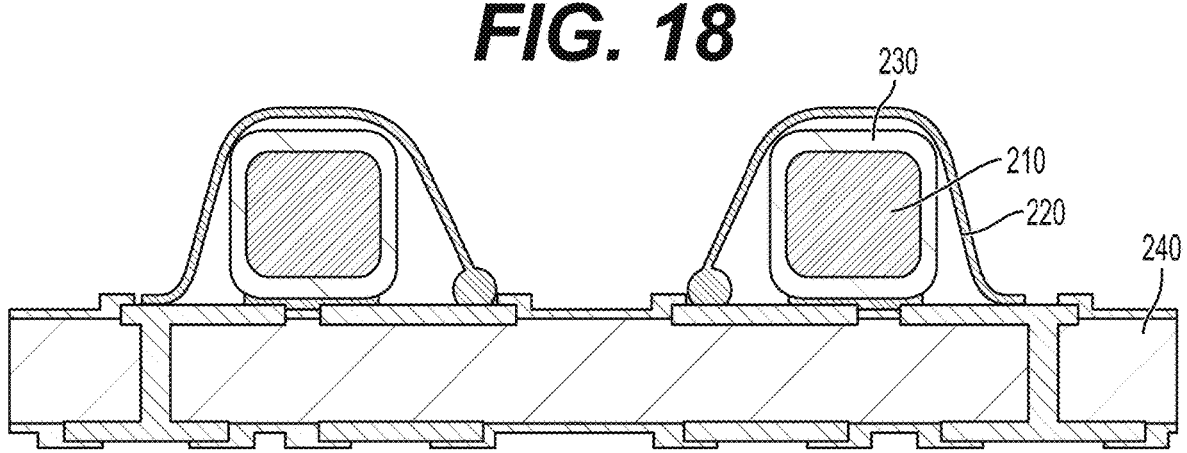
Figure 20:
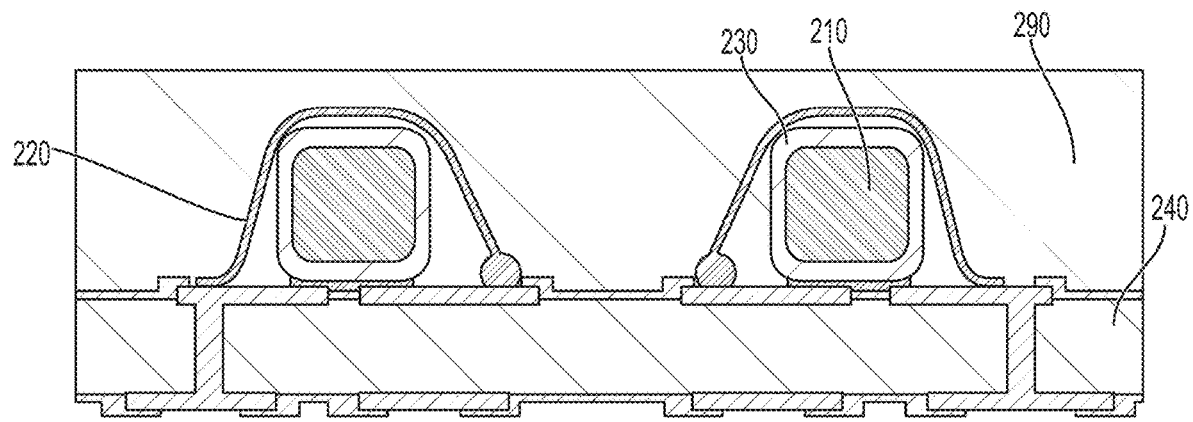
Figure 21:
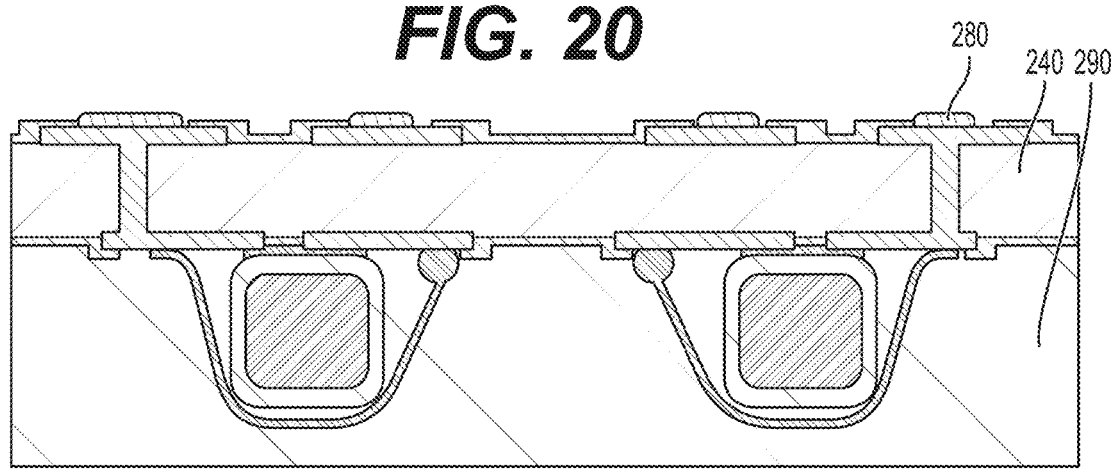
Figure 22:
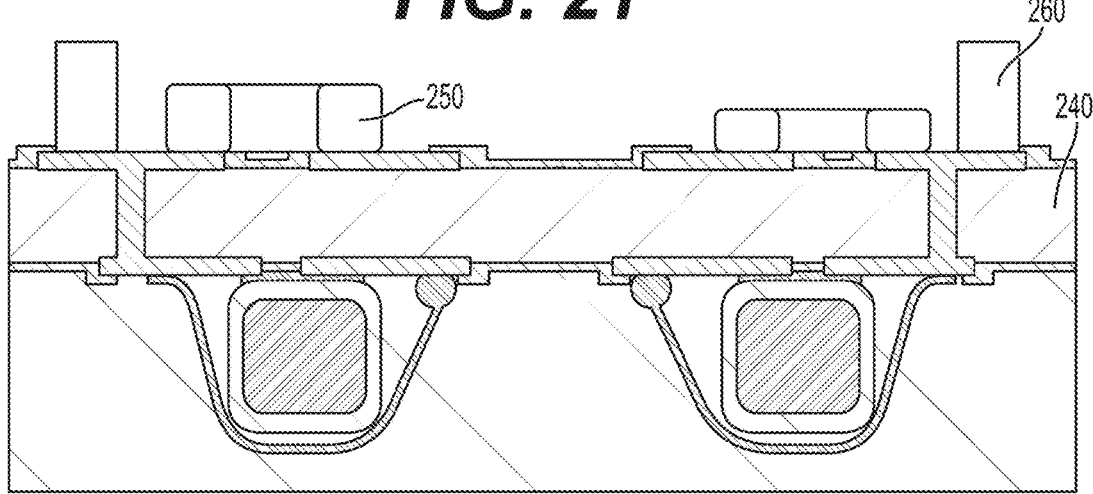
Figure 23:
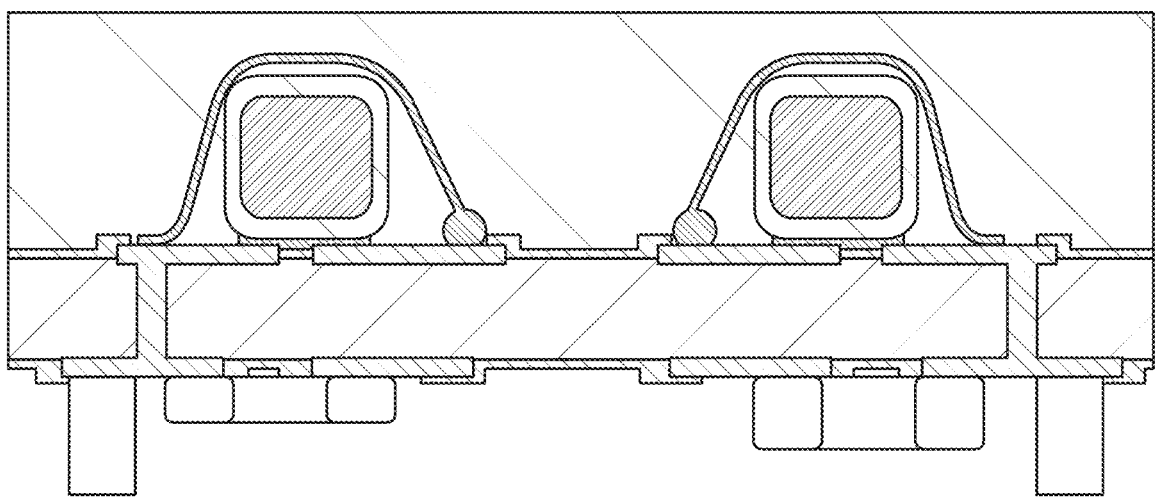

FIGS. 16-23 show steps of a method of manufacturing the magnetic-component module 200 shown in FIG. 15. FIG. 16 shows that the substrate 240, such as a PCB, can be provided with traces 245 on two opposing outer surfaces according to conventional techniques. FIG. 17 shows that an adhesive 270 can be deposited on portions of the surface of the substrate 240 on which the core 210 is to be mounted. FIG. 18 shows the core 210 that is covered on all sides by the spacer 230 can be adhered to the substrate 240 where the adhesive 270 was deposited. FIG. 19 shows that the wire bonds 220 can be formed such that the wire bonds 220 are attached to the substrate 240, extend over the core 210 covered by the spacer 230, and do not contact the core 210. FIG. 20 shows that an overmold material 290 can be overmolded to cover or encapsulate the core 210, the wire bonds 220, and the 230 spacer. FIG. 21 shows that solder 280 can be deposited on the substrate 240 on the opposite surface to the overmold material 290. FIG. 22 shows that the components 250 and the I/O pins 260 can be mounted on the substrate 240 using the solder 280. FIG. 23 shows the finished magnetic-component module 200 shown in FIG. 15.

Figure 24:
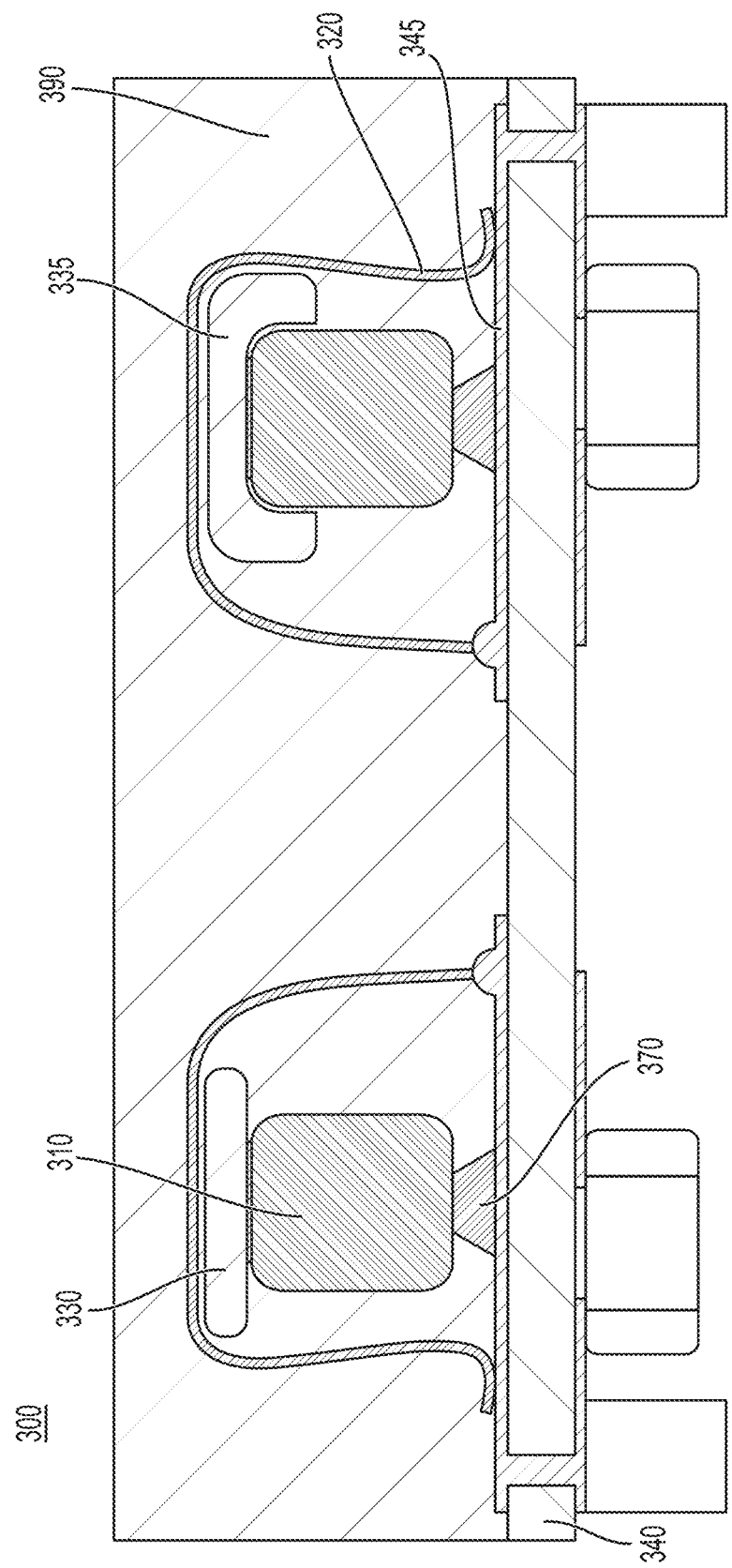
FIG. 24 shows a magnetic-component module with a core and a standoff.

As described above with respect to FIGS. 1 and 15, the core can be fixed to the top surface of the substrate. FIG. 24 shows an alternate arrangement of a magnetic-component module 300 in which an adhesive or glue layer 370 is thick enough to create a gap between the core 310 and the substrate 340 to allow the overmold material 390 to extend under the core 310 after bonding the wire bonds 320. The magnetic-component module 300 includes a core 310, winding(s) that are defined by wire bonds 320 and traces 345, a spacer 330, and a substrate 340. FIG. 24 shows a truncated conical shaped adhesive layer 370 provided under the core 310 that creates the gap between the core 310 and the substrate 340. The overmold material 390 can extend into the gap between the core 310 and the substrate 340, providing an additional insulation layer to strengthen the isolation barrier between the core 310 and the traces 345 on the top surface of the substrate 340. Because the overmold material 390 fills the gap between the core 310 and the substrate 340, it is not necessary to use a more expensive multilayer substrate, and it is possible to use a less expensive substrate 340 with no internal layers. But it is also possible to use a multilayer substrate in which the traces 345 defining the bottom half of the windings are located on the top surface or an internal layer of the multilayer substrate.

The left side of FIG. 24 shows an example of a spacer 330 between the top of the core 310 and the wire bonds 320 to prevent the wire from touching the core 310 and being short-circuited. As shown, the spacer 330 is wider than a width of the core 310 to create an overhang that maintains a predetermined distance between the wire bond 320 and the core 310. The right side of FIG. 24 shows an alternative configuration of the spacer 335 in which the spacer 335 conforms to the top portion of the core 310 and partially covers the side walls of the core 310. It should be understood that, typically, the spacer will have a single cross-sectional shape throughout the spacer and that the two different cross-sectional shapes shown in FIG. 24 are examples of possible cross-sectional shapes. FIGS. 29-34 show a magnetic-component module that uses the spacer 130 that is wider than the width of the core 110 to create an overhang.

As shown in FIG. 24, the magnetic-component module 300 can include surface-mount (SM) or input/output (I/O) pins 360 that are located on the bottom surface of the substrate 340. The magnetic-component module 300 can include electrical components 350 mounted on the bottom surface of the substrate 340. The electrical components 350 can include passive components, such as, capacitors, resistors, etc. and can include active components, such as transistors.

Figure 25:
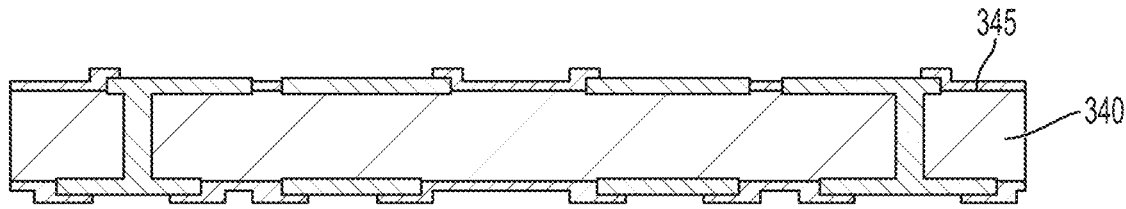
FIGS. 25-34 show steps of a method of manufacturing the magnetic-component module of FIG. 24.
Figure 26:
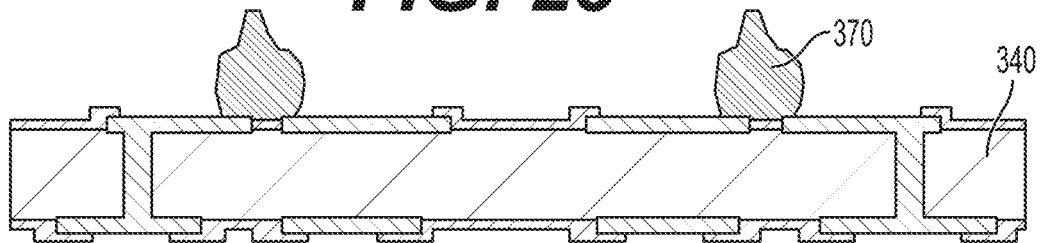
Figure 27:
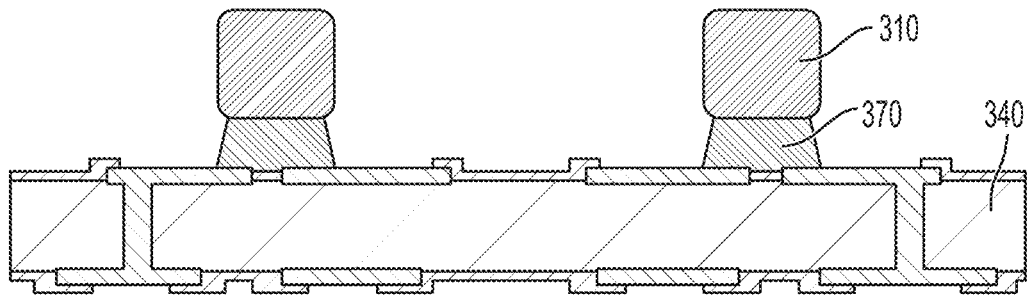
Figure 28:
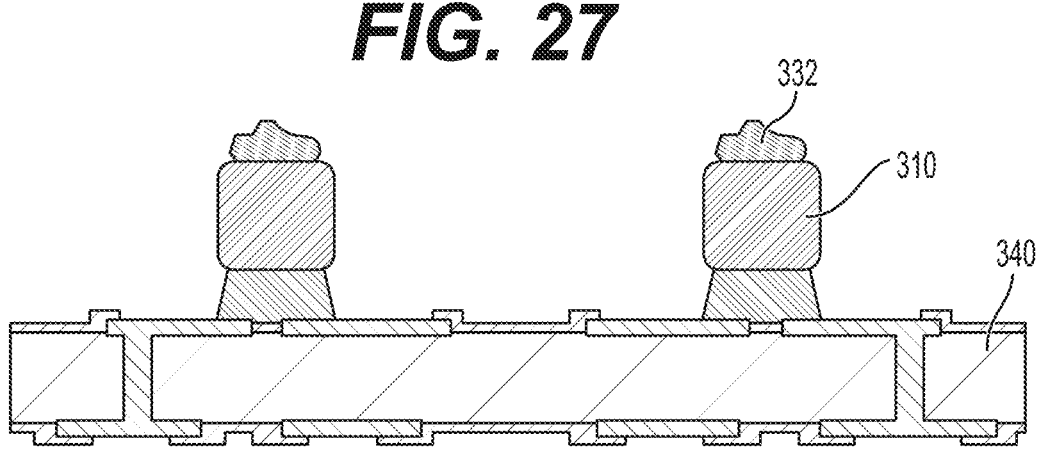
Figure 29:
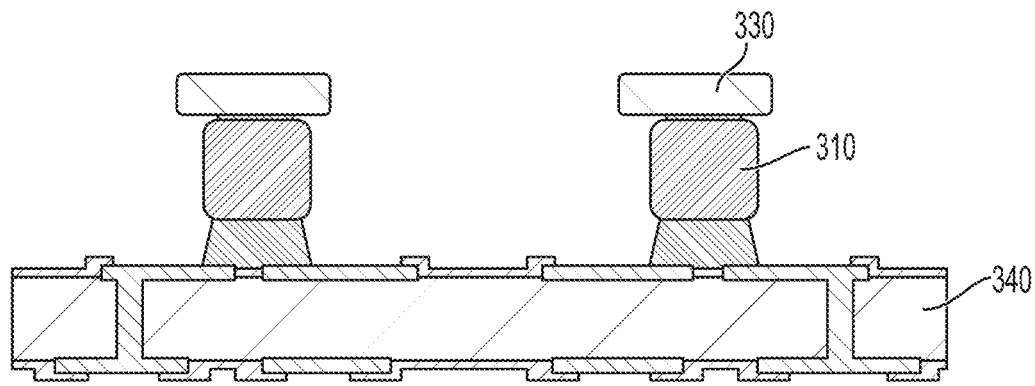
Figure 30:
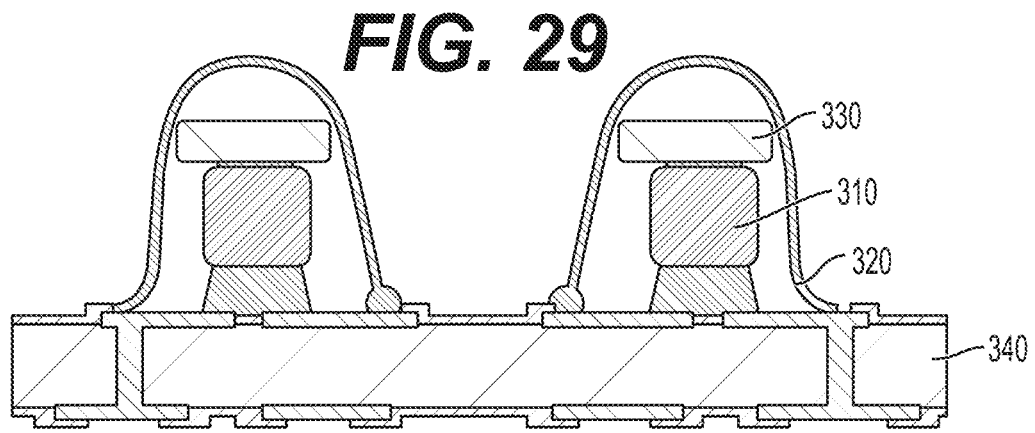
Figure 31:
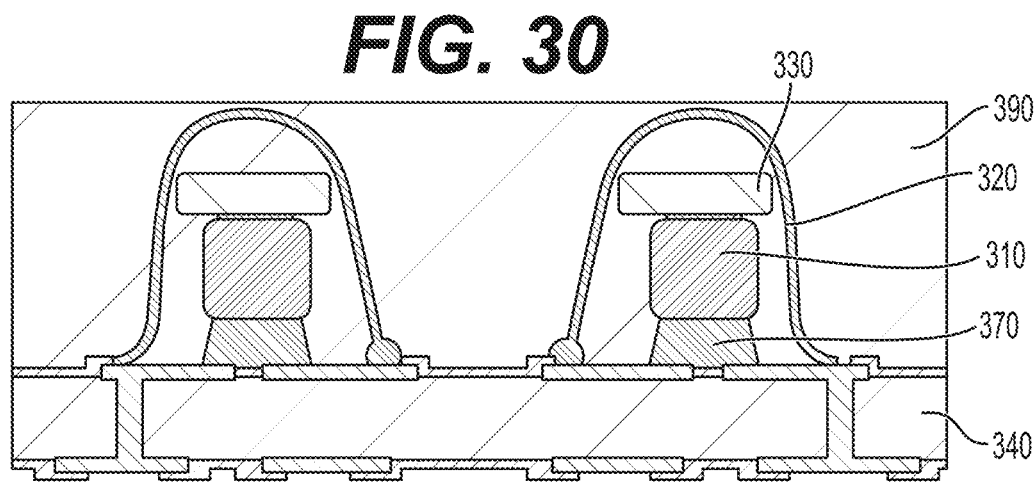
Figure 32:
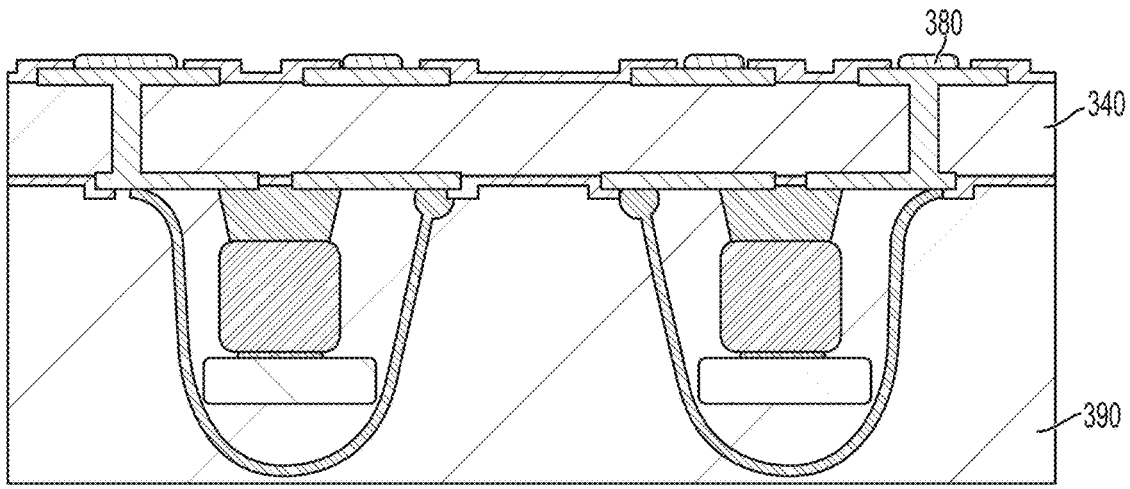
Figure 33:
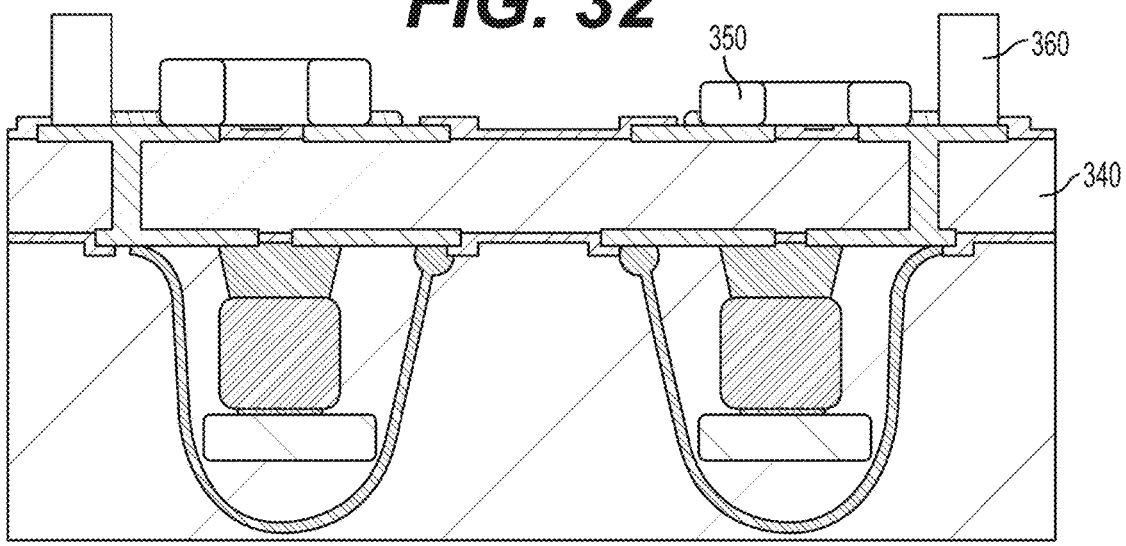
Figure 34:
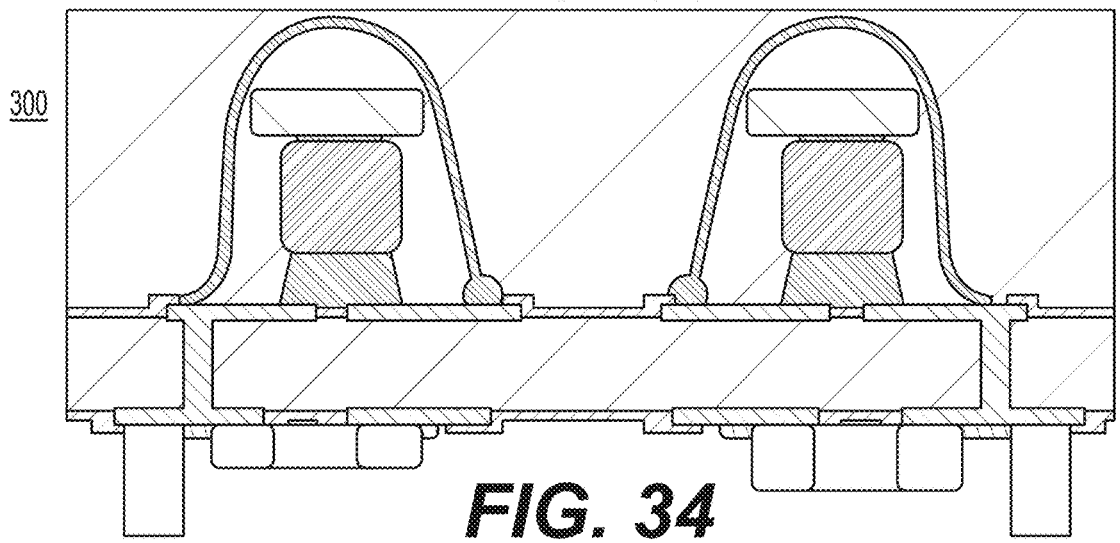

FIGS. 25-34 show steps of a method of manufacturing the magnetic-component module 300 shown in FIG. 24. FIG. 25 shows that the substrate 340, such as a PCB, can be provided with traces 345 on two opposing outer surfaces according to conventional techniques. FIG. 26 shows that an adhesive 370 can be deposited on portions of the surface of the substrate 340 on which the core 310 is to be mounted. FIG. 27 shows the core 310 can be adhered to the substrate 340 where the adhesive 370 was deposited. FIG. 28 shows that an adhesive 332 can be deposited on a top surface of the core 310. FIG. 29 shows that a spacer 330 can be adhered on the top surface of the core 310. FIG. 30 shows that the wire bonds 320 can be formed such that the wire bonds 220 are attached to the substrate 340, extend over the core 310 and the spacer 330, and do not contact the core 310. FIG. 31 shows that an overmold material 390 can be overmolded to cover or encapsulate the core 310, the wire bonds 320, the 330 spacer, and the adhesive 370. FIG. 32 shows that solder 380 can be deposited on the substrate 340 on the opposite surface to the overmold material 390. FIG. 33 shows that the components 350 and the I/O pins 360 can be mounted on the substrate 340 using the solder 380. FIG. 34 shows the finished magnetic-component module 300 shown in FIG. 24.

FIG. 4 shows a magnetic-component module 400 similar to that shown in FIG. 1, except that the input/output (I/O) pins 460 of the magnetic-component module 400 can be located on the same side of the substrate 440 as the core 410, the wire bonds 420, and the spacer 430. The magnetic-component module 400 includes a core 410, winding(s) that are defined by wire bonds 420 and traces 445, a spacer 430, and a substrate 440.

The I/O pins 460 can be made of a metal pillar or column connected to lands on the substrate 440 via a surface mounting process. After the magnetic-component module 400 including the I/O pins 460 and circuitry components 450 are overmolded, the top surface of the magnetic-component module 400 can be ground to remove overmold material 490 and expose the I/O pins 460. Having the I/O pins 460 exposed on the same side of the substrate 440 as the core 410 allows for a smaller and more integrated arrangement of components because overmolding allows for less clearance between the primary and secondary circuit components.

Figure 35:
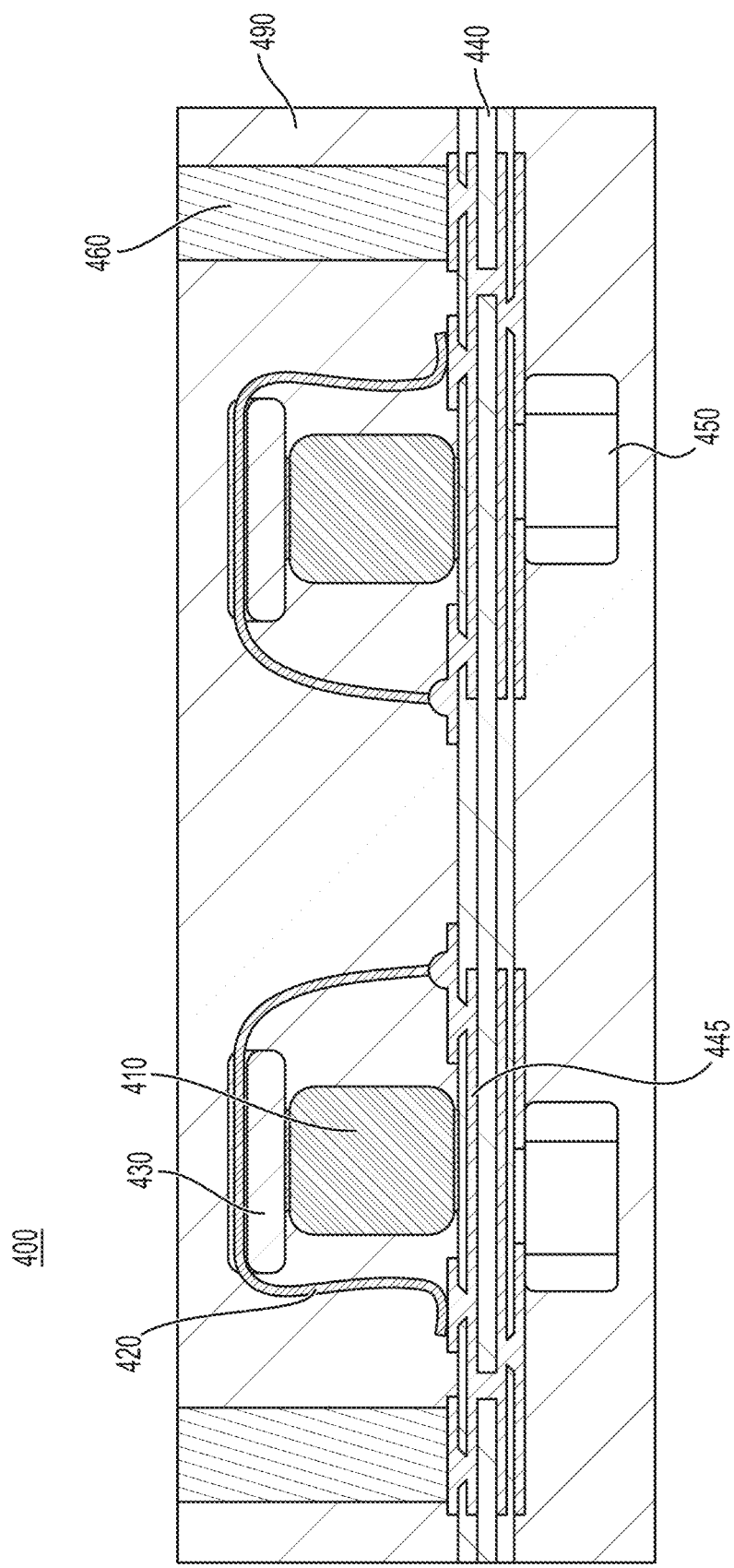
FIG. 35 shows a magnetic-component module with input/output pins.

As shown in FIG. 35, the magnetic-component module 400 can include electrical components 450 mounted on the bottom surface of the substrate 440. The electrical components 450 can include passive components, such as, capacitors, resistors, etc. and can include active components, such as transistors.

Figure 36:
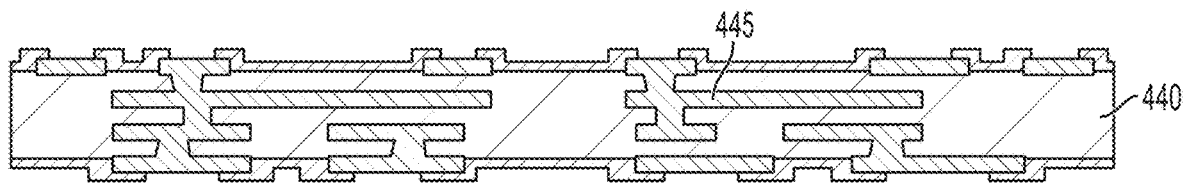
FIGS. 36-48 show steps of a method of manufacturing the magnetic-component module of FIG. 35.
Figure 37:
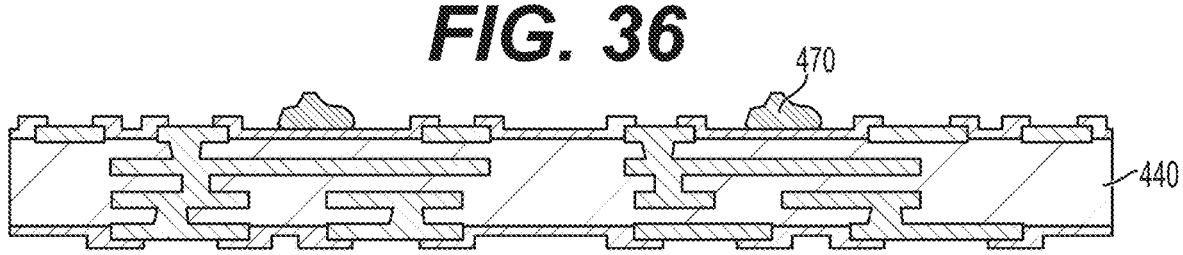
Figure 38:
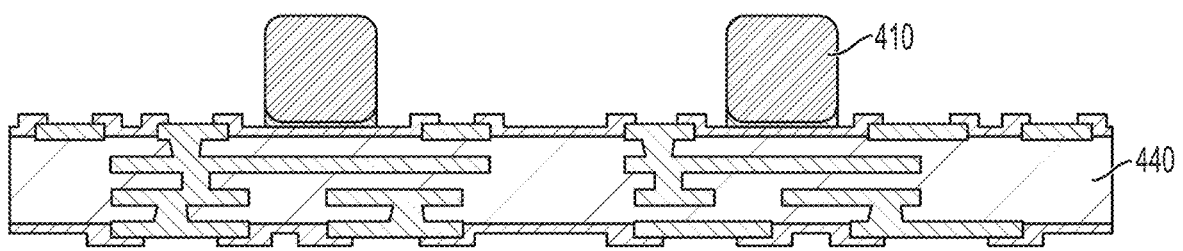
Figure 39:
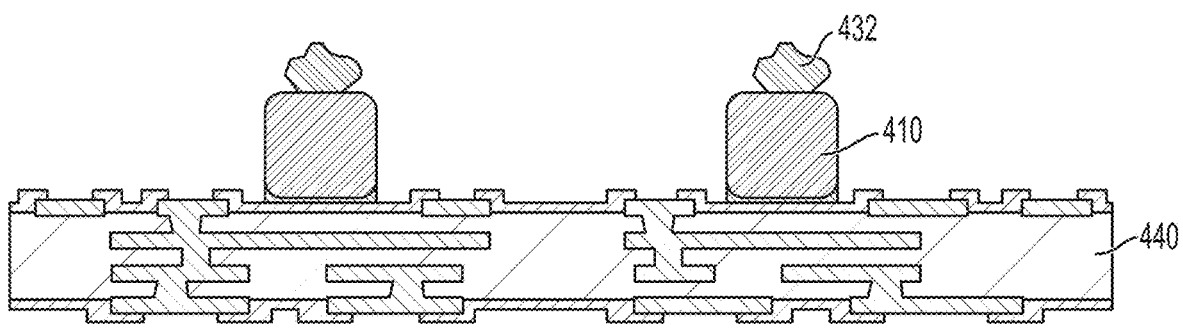
Figure 40:
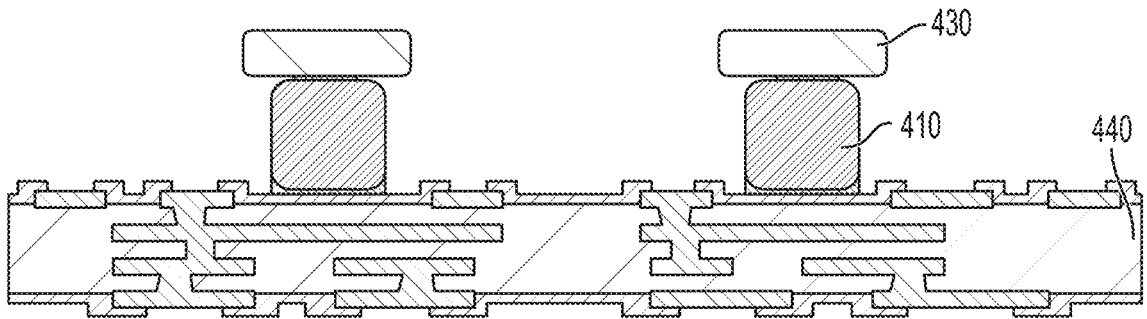
Figure 41:
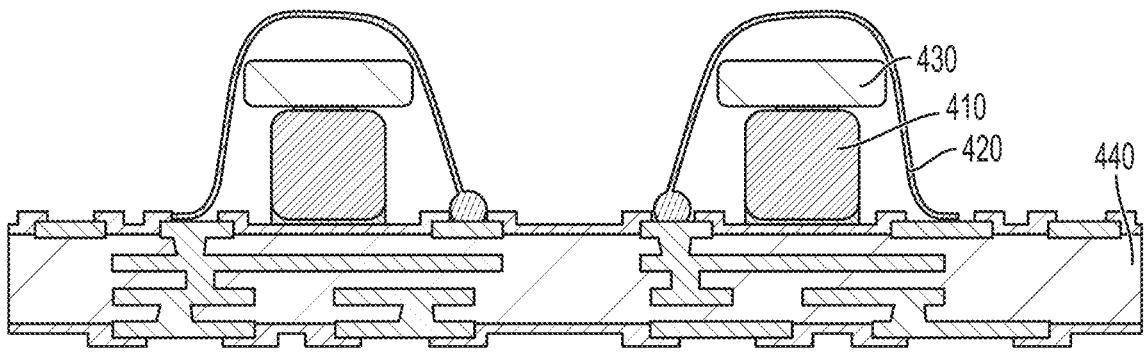
Figure 42:
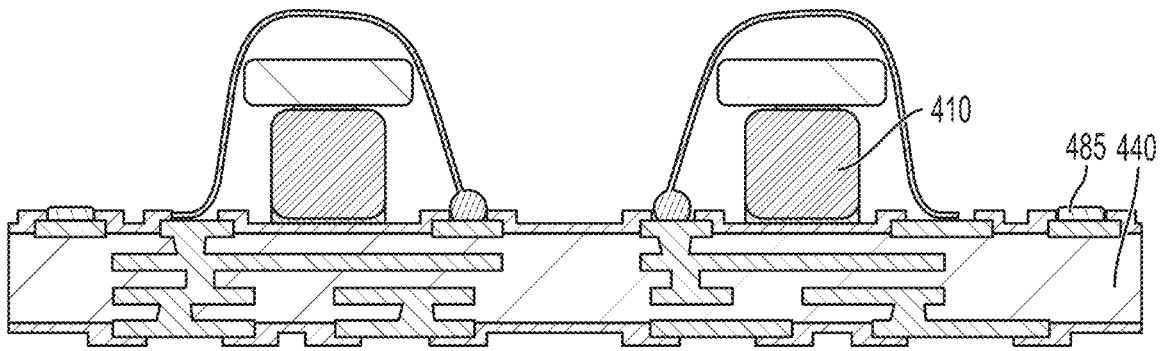
Figure 43:
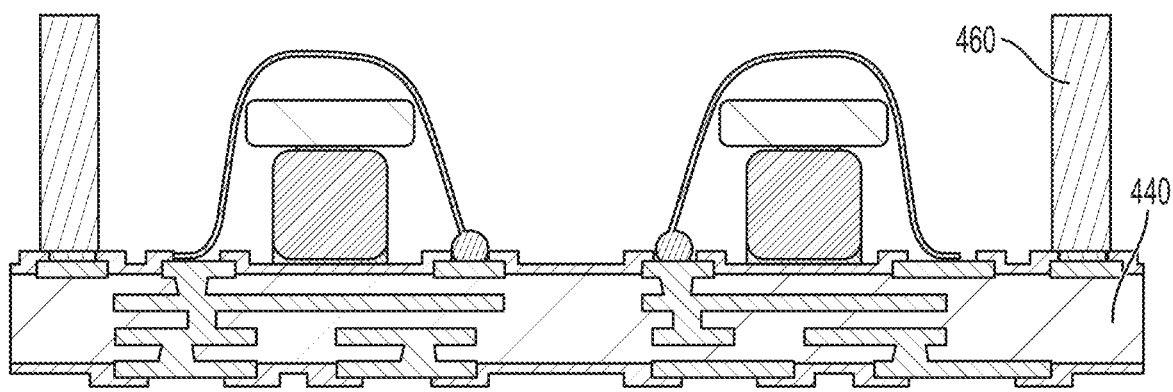
Figure 44:
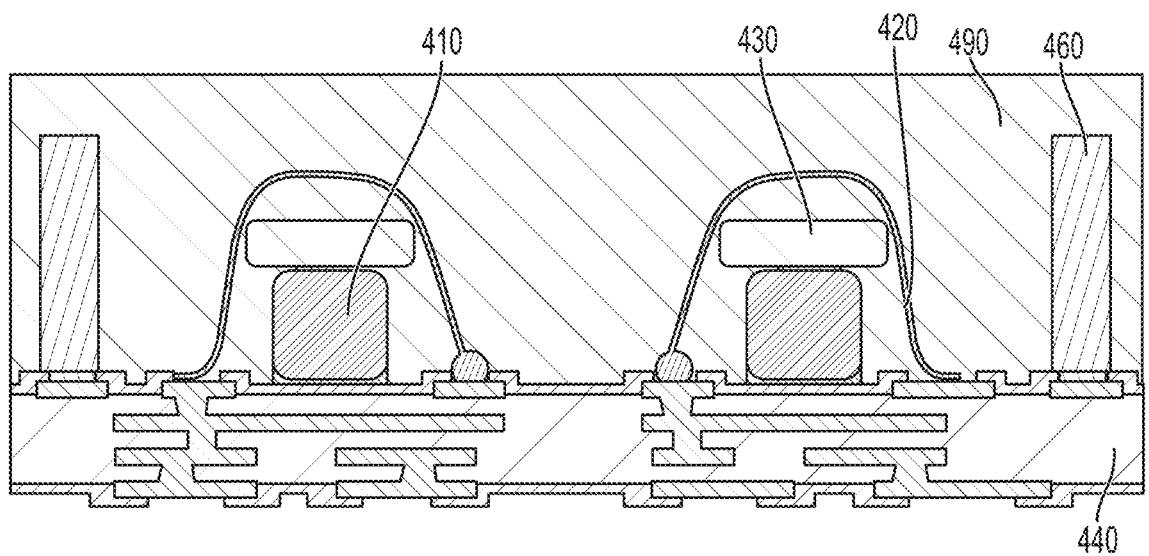
Figure 45:
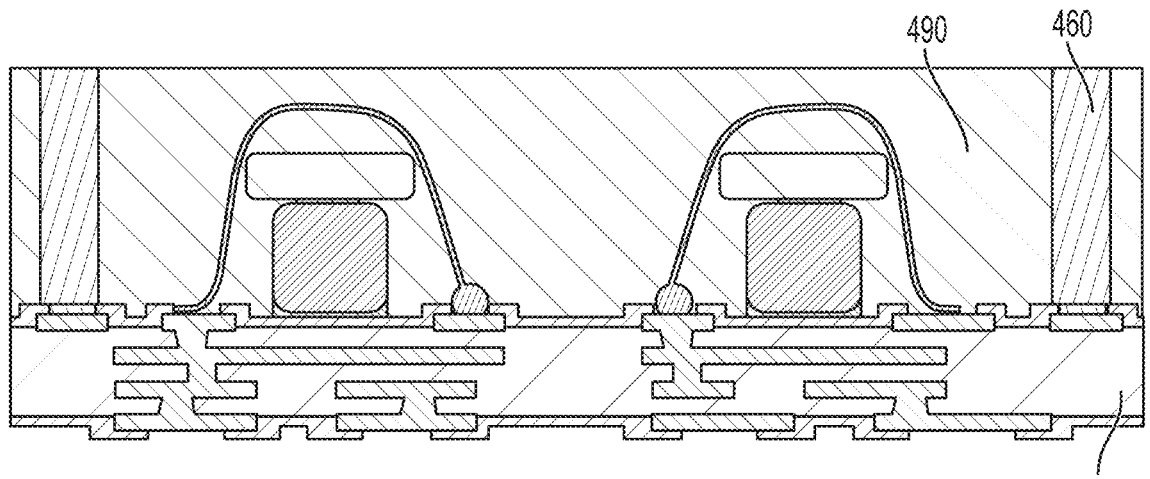
Figure 46:
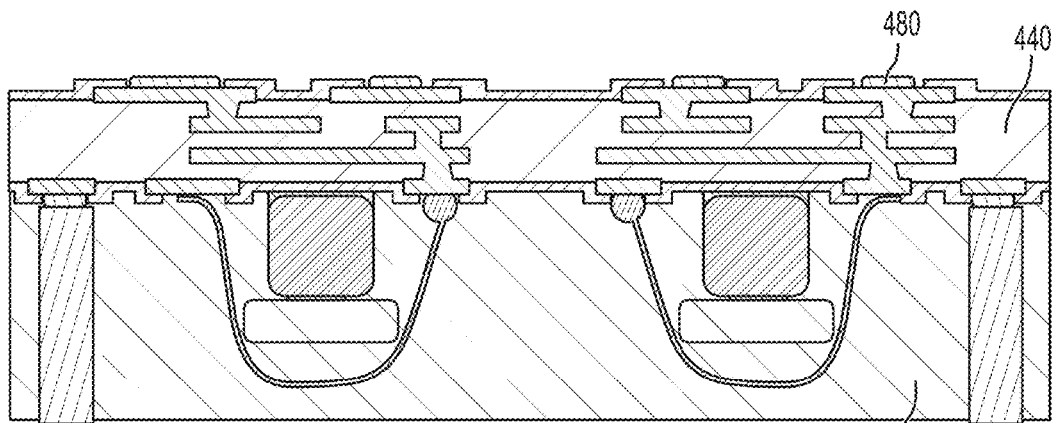
Figure 47:
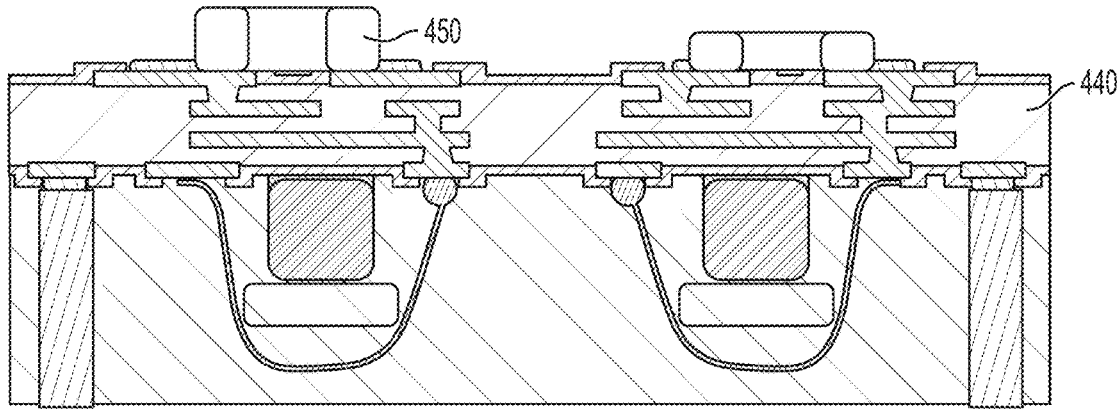
Figure 48:
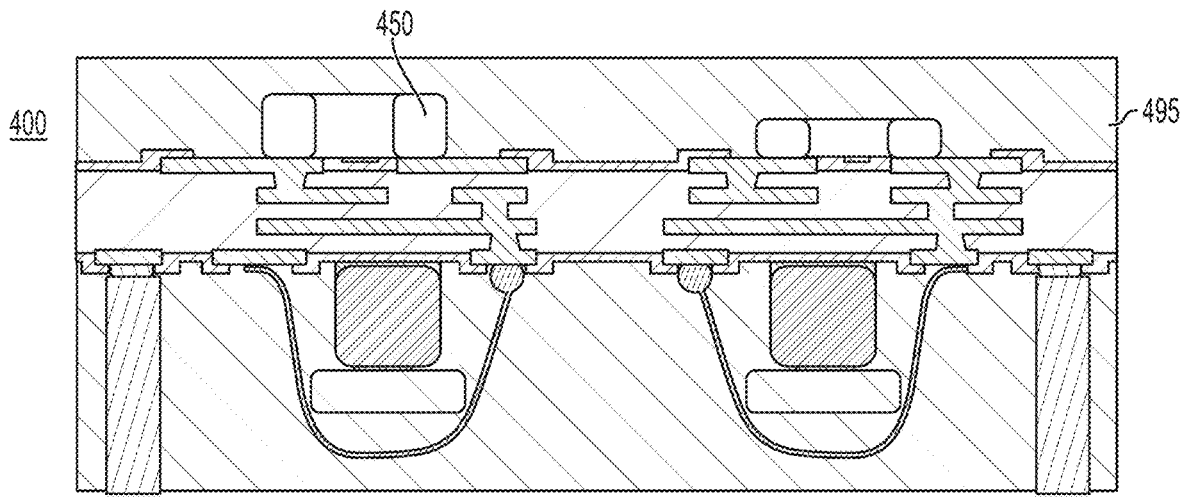
Figure 49:
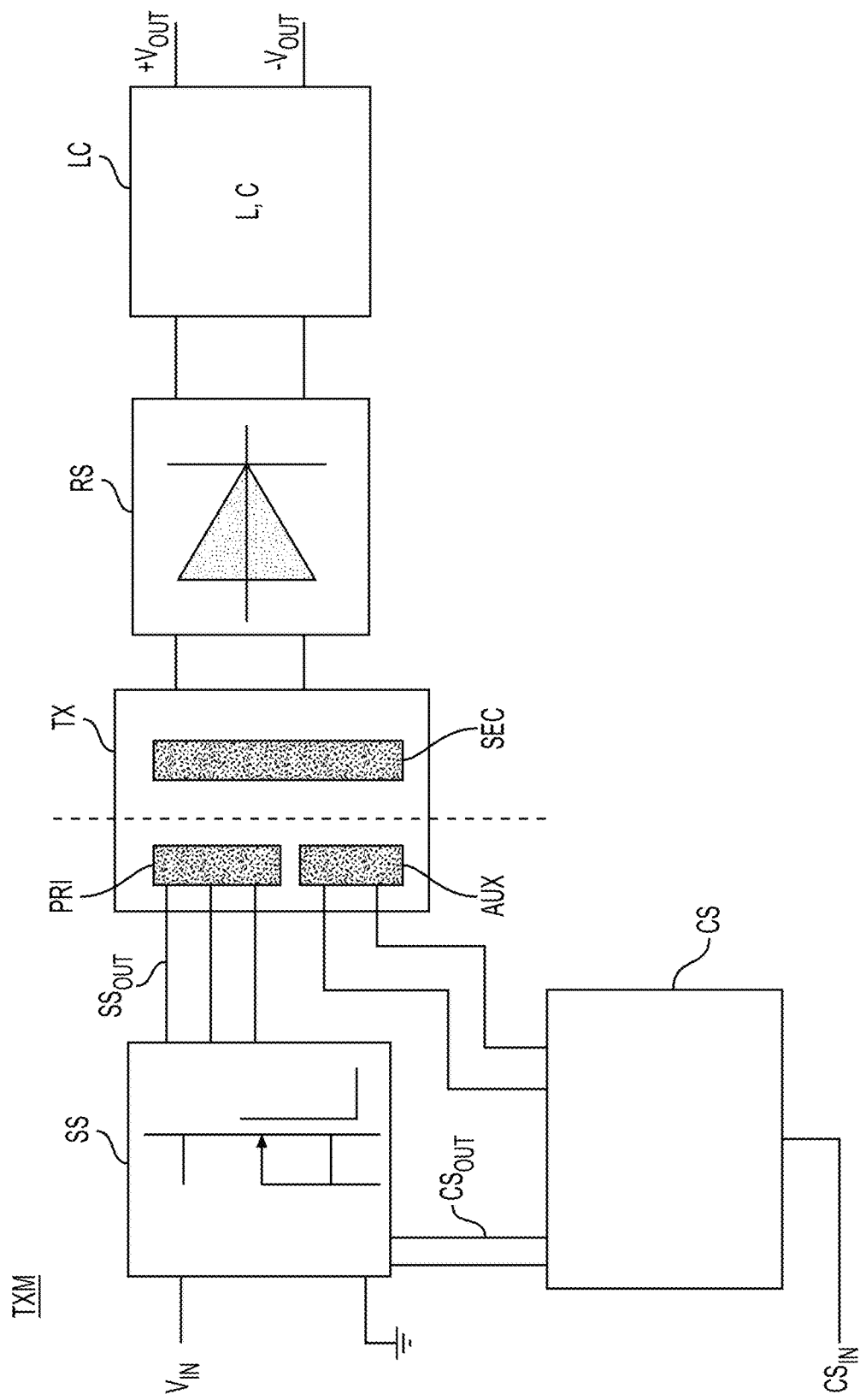
FIG. 49 is a block diagram of an example of an implementation of a magnetic-component module.
Figure 50:
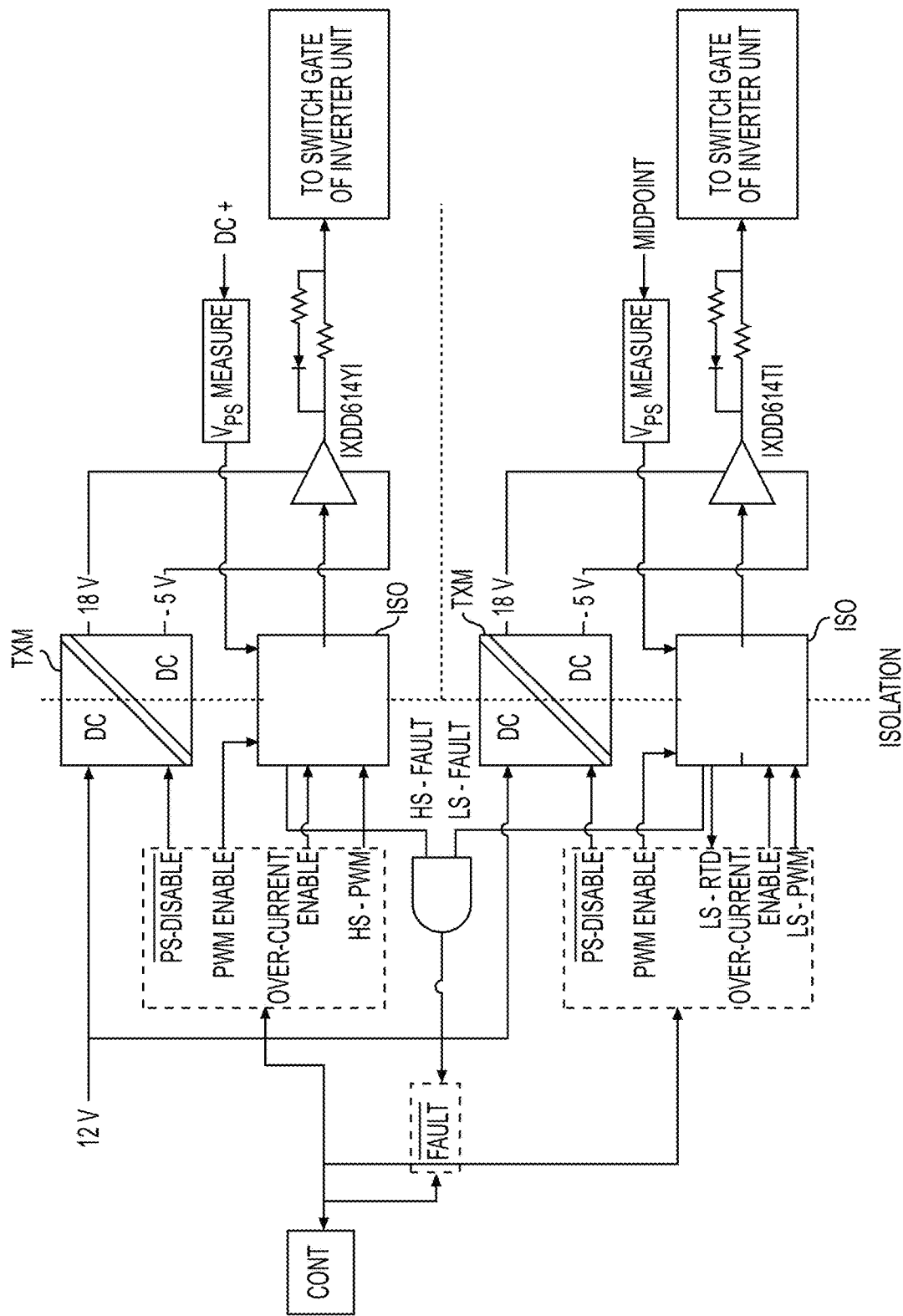
FIG. 50 is a block diagram of a gate-drive-circuit application that can include one or more of the magnetic-component modules shown in FIG. 49.
Figure 51:
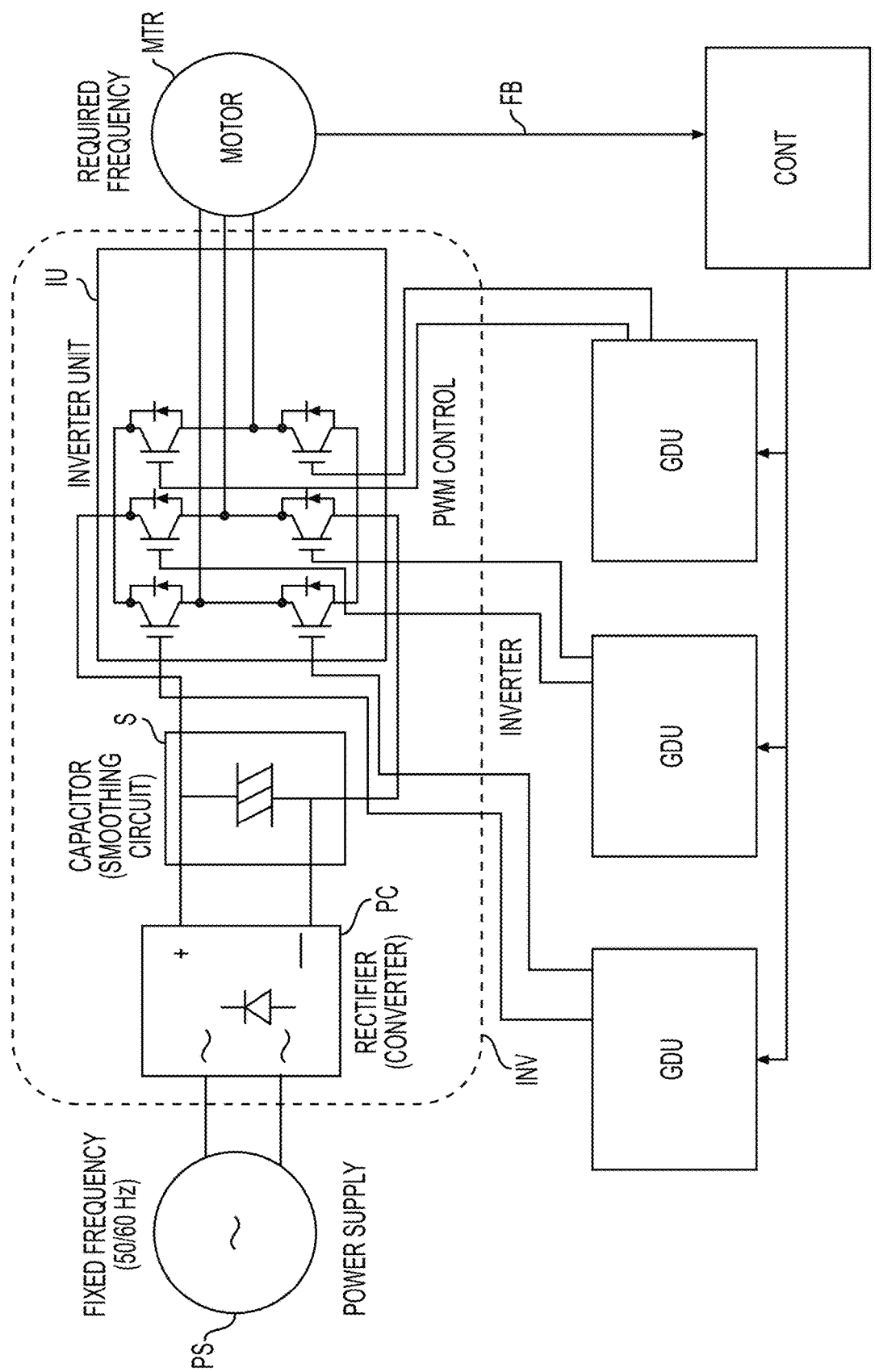
FIG. 51 is a circuit diagram of a motor control application that can include the gate drive units of FIG. 50.

FIGS. 36-48 show steps of a method of manufacturing the magnetic-component module 400 shown in FIG. 35. FIG. 36 shows that the substrate 440, such as a PCB, can be provided with traces 445 according to conventional techniques. FIG. 37 shows that an adhesive 470 can be deposited on portions of the surface of the substrate 440 on which the core 410 is to be mounted. FIG. 38 shows the core 410 can be adhered to the substrate 440 where the adhesive 470 was deposited. FIG. 39 shows that an adhesive 432 can be deposited on a top surface of the core 410. FIG. 40 shows that the spacer 430 can be adhered on the top surface of the core 410. FIG. 41 shows that the wire bonds 420 can be formed such that the wire bonds are attached to the substrate 440, extend over the core 410 and the spacer 430, and do not contact the core 410. FIG. 42 shows that solder 485 can be deposited on the substrate 440 on the same surface as the core 410. FIG. 43 shows that the I/O pins 460 can be mounted on the substrate 440 where the solder 485 was deposited. FIG. 44 shows that an overmold material 490 can be overmolded to cover or encapsulate the core 410, the wire bonds 420, the 430 spacer, and the I/O pins 460. FIG. 45 shows that a portion of the overmold material 490 can be removed to expose the I/O pins 460. FIG. 46 shows that solder 480 can be deposited on the substrate 440 on the surface opposite to the core 410 and the overmold material 490. FIG. 47 shows that the components 450 can be mounted on the substrate 440 using the solder 480. FIG. 48 shows that an overmold material 495 can be overmolded to cover or encapsulate the components 450 to finish the magnetic-component module 400 shown in FIG. 48.

Alternatively, an overmold material can be overmolded to cover or encapsulate the core 410, the wire bonds 420, the 430 spacer, the I/O pins 460, and the electrical components 450 in the same step.

FIG. 44 is a block diagram of an example of an implementation of a magnetic-component module TXM. In FIG. 44, the magnetic-component module TXM is implemented as an isolated converter with the dashed line through the transformer TX showing the isolation boundary. The primary side that is on the left side of FIG. 44 and that is connected to the primary winding PR is isolated from the secondary side that is on the right side of FIG. 44 and that is connected to the secondary winding SEC. For example, FIG. 44 shows that the electronic module TXM can include a switching stage SS, a control stage CS, a transformer TX, a rectifier stage RS, and an output filter LC. The transformer TX can include the core and windings that are defined by wire bonds and traces as previously described. The circuitry and components other than the transformer TX can include other electronic components that are attached to the substrate or PCB on which the transformer TX is mounted, as previously described.

As shown in FIG. 44, the switching stage SS receives an input voltage Vin and outputs a voltage SSout to at least one primary winding PRI of the transformer TX. The switching stage can include switches or transistors that control the flow of power. The control stage CS includes an input control signal CSin. The control stage CS can control the switching of the switches in the switching stage SS and can monitor the transformer TX via an auxiliary winding AUX. The dotted vertical line through the transformer TX represents the galvanic isolation between the primary winding PRI and the auxiliary winding AUX from the secondary winding SEC. The secondary winding of the transformer TX can be connected to a rectifier stage RS that in turn is connected to an output filter LC that outputs a DC voltage between +Vout and −Vout. The rectifier stage can include diodes and/or synchronous rectifiers that rectify the voltage at the secondary winding SEC. The output filter LC can include an arrangement of inductor(s) and capacitor(s) to filter unwanted frequencies.

FIG. 45 is a block diagram of a gate-drive-circuit application that can include one or more of the magnetic-component modules TXM shown in FIG. 44. The vertical and horizontal dotted lines represent galvanic isolation. FIG. 45 shows that the magnetic-component modules TXM can include, for example, a +12 Vdc input and −5 Vdc and +18 Vdc outputs, which could be used, for example, to drive metal-oxide-semiconductor field-effect transistor (MOSFETs) or insulated-gate bipolar transistors (IGBTs). The outputs of the magnetic-component modules TXM can be connected to gate driver IXDD614YI. A controller CONT can transmit and receive control signals represented by those control signals shown in the dotted-line boxes, including, for example, power-supply disable, pulse-width modulation PWM enable, low-side and high-side PWM, over-current detection, etc. The control signals can be transmitted and received between the controller CONT and the isolation circuitry ISO and between the controller CONT and the magnetic-component modules TXM. The isolation circuitry ISO can receive and transmit feedback signals $V_{DS}$ Measure. The isolation circuitry can include a transformer, a capacitor, an opto-coupler, a digital isolator, and the like. The output of the gate drive circuit can be connected to a gate of a switch located in an inverter-unit circuitry as a portion of an inverter for a motor control application as shown in FIG. 46.

FIG. 46 shows circuitry for a motor control application that can include a power supply PS running at a fixed frequency of 50 Hz or 60 Hz, for example, an inverter INV, and a motor MTR running at its required frequency. As shown, the inverter INV can include a power converter PC, a smoothing circuit S, and inverter unit circuitry IU controlled with PWM control. FIG. 46 shows that a controller CONT can be included to control the gate drive units GDU of FIG. 45. The gate drive units GDU can control the gates of the switches within the inverter unit circuitry IU. Feedback FB can be provided to the controller CONT from the motor MTR to stabilize control of the gate drive units GDU.

A package including the magnetic-component module can be any size. For example, the package can be about 12.7 mm by about 10.4 mm by about 4.36 mm. A package with these dimensions can provide higher isolation. The magnetic-component module can be used in many different applications, including, for example, industrial, medical, and automotive applications. For example, as explained above, the magnetic-component module can be included in a gate drive. The magnetic-component module can provide 1 W-2 W of power with an efficiency of greater than 80% and can provide 3 kV or 5 kV breakdown rating depending on the footprint of the magnetic-component module, for example. The magnetic-component module can include UL-required reinforced isolation and can operate at temperatures between about −40° C. and about 105° C. or between about −40° C. and about 125° C., for example. The magnetic-component module can have a moisture sensitivity level (MSL) of 1 or 2, for example, depending on the application. The magnetic component module can be used in battery management systems or programmable logic controller and data acquisition and communication compliant with RS484/232.

If the magnetic-component module includes a transformer, then, for example, the primary winding can include at least 20 turns and the secondary winding can include 12 turns. The coupling factor of the transformer can be 0.99, for example. The primary windings can have a direct-current resistance (DCR) of about 17.8 Ω/turn, and the secondary windings can have DCR of about 16.9 Ω/turn, for example. The maximum current can be 600 mA (over-current protection) with typical current being 300 mA, for example, to ensure that the magnetic-component module is not damaged in such over-current situations. The core can have an inner diameter of about 5.4 mm, an outer diameter of about 8.8 mm, and a height of about 1.97 mm, for example. The spacer can have an inner diameter of about 5.1 mm, an outer diameter of about 8.8 mm, and a height of about 0.2 mm, for example. The transformer can have size of about 12.7 mm by about 10.4 mm by about 2.5 mm, for example. The core can be made of any suitable material, including, for example, Mn—Zn, Ni—Zn, FeNi, and the like. The spacer can be made of any suitable material, including, for example, an epoxy adhesive. The wire bonds can be made of any suitable material, including, for example, Al or Cu. The pins can be made of any suitable material, including, for example, Cu with Ni—Sn coating. The overmold material can be made of any suitable material, including, for example, epoxy resin.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A magnetic-component module comprising:
    a substrate;
    a core that is on a first surface of the substrate and that includes a top surface and a bottom surface that are connected by side walls;
    a spacer that conforms to the top surface of the core and that covers less than half of the side walls of the core;
    a winding including:
        wire bonds extending over the core and electrically connecting a first portion of the substrate and a second portion of the substrate; and
        traces on and/or in the substrate; and
    an overmold material encapsulating the core, the spacer, and the wire bonds.

2. The magnetic-component module according to claim 1, wherein electrical components are attached to a second surface of the substrate that is opposite to the first surface of the substrate.

3. The magnetic-component module according to claim 1, further comprising a gap between a bottom surface of the core and the first surface of the substrate, wherein
    the overmold material fills the gap.

4. The magnetic-component module according to claim 3, wherein
    an adhesive is in the gap between the core and the substrate, and
    the overmold material encapsulates the adhesive.

5. The magnetic-component module according to claim 1, further comprising input/output pins on a surface of the substrate.

6. The magnetic-component module according to claim 5, wherein the input/output pins are exposed on the first surface of the substrate.

7. The magnetic-component module according to claim 1, further comprising an adhesive to mount the core to the substrate.

8. The magnetic-component module according to claim 1, wherein the spacer includes a polyethylene terephthalate resin.

9. A magnetic-component module comprising:
    a substrate;
    a core on a first surface of the substrate;
    a spacer that extends only along a top surface of the core such that an edge of the spacer overhangs the core;
    a winding including:
        wire bonds extending over the core and electrically connecting a first portion of the substrate and a second portion of the substrate; and
        traces on and/or in the substrate; and
    an overmold material encapsulating the core, the spacer, and the wire bonds.

10. The magnetic-component module according to claim 9, wherein electrical components are attached to a second surface of the substrate that is opposite to the first surface of the substrate.

11. The magnetic-component module according to claim 9, further comprising a gap between a bottom surface of the core and the first surface of the substrate, wherein
    the overmold material fills the gap.

12. The magnetic-component module according to claim 11, wherein
    an adhesive is in the gap between the core and the substrate, and
    the overmold material encapsulates the adhesive.

13. The magnetic-component module according to claim 9, further comprising input/output pins on a surface of the substrate.

14. The magnetic-component module according to claim 13, wherein the input/output pins are exposed on the first surface of the substrate.

15. The magnetic-component module according to claim 9, further comprising an adhesive to mount the core to the substrate.

16. The magnetic-component module according to claim 9, wherein the spacer includes a polyethylene terephthalate resin.

* * * * *